US011063849B1

(12) United States Patent  
Clegg et al.

(10) Patent No.: US 11,063,849 B1  
(45) Date of Patent: Jul. 13, 2021

(54) TECHNIQUES FOR AUTOMATED SOFTWARE TESTING

(71) Applicant: SAS Institute Inc., Cary, NC (US)

(72) Inventors: Andrew Bynum Clegg, Cary, NC (US); Christopher Chase Struble, Raleigh, NC (US); Ronald Andrew Hackett, Cary, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 16/985,311

(22) Filed: Aug. 5, 2020

Related U.S. Application Data

(60) Provisional application No. 62/961,302, filed on Jan. 15, 2020, provisional application No. 62/977,379, filed on Feb. 16, 2020.

(51) Int. Cl.
| | | |
|---|---|---|
| *G06F 15/173* | (2006.01) | |
| *H04L 12/26* | (2006.01) | |
| *G06F 11/34* | (2006.01) | |
| *H04L 29/08* | (2006.01) | |
| *H04L 29/06* | (2006.01) | |

(52) U.S. Cl.  
CPC ........ *H04L 43/045* (2013.01); *G06F 11/3409* (2013.01); *H04L 43/50* (2013.01); *H04L 67/02* (2013.01); *H04L 69/28* (2013.01)

(58) Field of Classification Search  
CPC ....... H04L 43/045; H04L 43/50; H04L 67/02; H04L 69/28; G06F 11/3409  
USPC .................................................. 709/223, 224  
See application file for complete search history.

(56) References Cited

U.S. PATENT DOCUMENTS

| | | | |
|---|---|---|---|
| 7,516,216 B2 | 4/2009 | Ginsberg et al. | |
| 9,921,942 B1* | 3/2018 | Makohon | G06F 11/3672 |
| 10,313,203 B2* | 6/2019 | White | G06F 21/577 |
| 2006/0101403 A1 | 5/2006 | Sharma et al. | |
| 2010/0031156 A1* | 2/2010 | Doyle | H04L 43/022 715/736 |
| 2010/0287390 A1* | 11/2010 | Yu | G06F 1/3209 713/310 |
| 2011/0249808 A1* | 10/2011 | Pavel | H04M 3/2254 379/26.01 |
| 2012/0254398 A1* | 10/2012 | Thomas | H04L 43/06 709/224 |

(Continued)

OTHER PUBLICATIONS

Author Unknown., "Automate User Interface Tests" Android Developers, retrieved Feb. 15, 2020. URL: https://developer.android.com/training/testing/ui-testing.

(Continued)

*Primary Examiner* — Liang Che A Wang

(57) ABSTRACT

Various embodiments are generally directed to techniques for automated software testing, such as by verifying operations are complete based on user interface and/or network traffic indications, for instance. Some embodiments are particularly directed to utilizing a network sniffer to detect specific network traffic to verify completion of network requests and/or responses associated with an operation included in a workflow for performance by a software under test (SUT). In many embodiments, the detection of specific network traffic may be used to accurately time operation durations and/or efficiently perform workflows to evaluate the SUT.

30 Claims, 36 Drawing Sheets

(56) References Cited

U.S. PATENT DOCUMENTS

| | | | | |
|---|---|---|---|---|
| 2015/0120959 | A1* | 4/2015 | Bennett | H04L 47/10 709/233 |
| 2016/0381080 | A1* | 12/2016 | Reddem | G06F 21/31 726/1 |
| 2017/0185679 | A1* | 6/2017 | Anand | G06F 16/9535 |
| 2018/0167285 | A1 | 6/2018 | Constantinescu et al. | |

OTHER PUBLICATIONS

Author Unknown., "Automating HttpWatch" URL: https://help.httpwatch.com/automating_link.html. Retrieved Jan. 6, 2020.

Author Unknown., "Fiddler-Free Web Debugging" Telerik, retrieved Jan. 6, 2020. URL: https://www.telerik.com/fiddler.

Author Unknown., "Fiddler (software)" Wikipedia, retrieved Jan. 6, 2020. URL: https://en.wikipedia.org/wiki/Fiddler_(software).

Author Unknown., "HttpWatch" URL: https://https://www.httpwatch.com/. Retrieved Jan. 6, 2020.

Author Unknown., "Introduction to HttpWatch 12.x" HttpWatch—retrieved Jan. 6, 2020> URL: https://help.httpwatch.com.

Author Unknown., "Cloud-Based Load Testing in Real Browsers" LoadView—retrieved Jan. 6, 2020. URL: https://www.loadview-testing.com.

Author Unknown., "LoadRunner Professional" MicroFocus—retrieved Jan. 6, 2020. URL: https://www.microfocus.com/en-us/products/loadrunner-professional/overview.

Author Unknown., "LoadRunner and Performance Center 1255/12.56" MicroFocus—retrieved Jun. 29, 2018.

Author Unknown., "loadView vs. viewDidLoad" UR: http://roopc.net/posts/2015/loadview-vs-viewdidload/. Retrieved Jan. 6, 2020.

Author Unknown., "Selenium Tutorial for Beginners: Learn WebDriver in 7 Days" Guru99—retrieved Jan. 6, 2020. URL: Ittps://www.guru99.com/selenium-tutorial.html.

Author Unknown., "Automated Testing Tools" Ranorex—retrieved Jan. 6, 2020. URL: https://www.ranorex.com/test-automation-tools/.

Author Unknown., "The Selenium Browser Automation Project" retrieved Jan. 6, 2020. URL: https://selenium.dev/documentation/en/.

Sercely, Ronald., "TruClient Protocol — Should You Use It?" Visionary Integration Professionals—published May 24, 2016, retrieved Jan. 6, 2020. URL: https://trustvip.com/truclient-protocol-should-you-use-it/.

Author Unknown., "What is Interface Testing? Types & Example" Guru99 - retrieved 02115/2020. URL: https://www.guru99.com/interface-testing.html#:—:text=Interface%20Testing%20is%20defined%20as,Api's%2C%20web% 20services%2C%20etc.

Author Unknown., "Why Ranorex Studio" Ranorex—retrieved Jan. 6, 2020. URL: https://www.ranorex.com/why-ranorex/.

* cited by examiner

```
1   /// <summary>
2   /// Handles reportData/jobs calls, and counts and then waits for the number of CSVs we expected to receive
3   /// </summary>
4   /// <param name="RequiredJobsCount">Number of jobs calls to wait for.</param>
5   /// <param name="timeout_secs">Seconds to wait before failing. Default: 120 seconds.</param>
6   [UserCodeMethod]
7   public static void WaitForJobsWithCSVs(string RequiredJobsCount, int timeout_secs = 0) {
8       string URLfilter = "reportData/jobs";
9       string RequiredCount = RequiredJobsCount;
10      string RequestFinishedString = "\"state\" : \"completed\"";
11      string ContainedFileRegex = @"\.csv";
12      HttpWatchHandler.WaitForRequestsWithRelatedURLs(URLfilter, RequiredCount, RequestFinishedString, ContainedFileRegex, timeout_secs);
13  }
```

FIG. 19A
1900A

```
1   /// <summary>
2   /// Waits for [RequiredMatches] number of [URLfilter] calls with [RequestFinishedString] in the Content of the request.
3   /// Then it counts the number of [ContainedFileRegex] (format: Regex, regex101.com). CSV example: \.csv (in this example, the backslash escapes the period)
4   /// Then it waits for that number of Requests with [ContainedFileRegex] in the URL
5   /// </summary>
6   /// <param name="URLfilter">URLs to wait to be completed and contain RequestFinishedString</param>
7   /// <param name="RequiredMatches">Number of matching URLs to wait for</param>
8   /// <param name="RequestFinishedString">String that the actually completed URLfiltered requests contain. E.g. "state": "completed"</param>
9   /// <param name="ContainedFileRegex">Regex string to search for and count in Content of completed requests and wait for that number of requests</param>
10  /// <param name="timeout_secs">Timeout to search for. Default 120.</param>
11  [UserCodeMethod]
12  public static void WaitForRequestsWithRelatedURLs(string URLfilter, string RequiredMatches, string RequestFinishedString, string ContainedFileRegex, int timeout_secs)
13  {
14      if (timeout_secs == 0) {
15          timeout_secs = 120;
16      }
17      System.Diagnostics.Stopwatch stopwatch_timeout = new System.Diagnostics.Stopwatch();
18      stopwatch_timeout.Start();
19      List<HttpWatch.Entry> entry_list = new List<HttpWatch.Entry>();
20      entry_list = HttpWatchHandler.internal_ConfirmRequestsCompletedWithContent(URLfilter, RequiredMatches, RequestFinishedString, timeout_secs);
21      //Report.Info("Jobs count", entry_list.Count.ToString());
22      int contained_file_count = 0;
23      foreach (HttpWatch.Entry entry in entry_list) {
24      
25          contained_file_count += Regex.Matches(entry.Content.Text, ContainedFileRegex).Count;
26          //Report.Info("CSV count", entry.URL);
27          //Report.Info("CSV count", csv_count.ToString());
28      }
29      stopwatch_timeout.Stop();
30      //Report.Info("CSV total", csv_count.ToString());
31      timeout_secs = timeout_secs - (int)(stopwatch_timeout.ElapsedMilliseconds / 1000);
32      if (timeout_secs <= 0)
33          timeout_secs = 1;
34      // Wait for the correct number of "CSVs" that were found in the main request, to finish their requests. If 0, then skip this step.
35      if (contained_file_count != 0) {
36          HttpWatchHandler.internal_ConfirmRequestsCompleted(ContainedFileRegex.TrimStart("\\"), contained_file_count.ToString(), false,
```

FIG. 19B
*1900B*

```
37  timeout_secs);
38     }
       // Store the RequiredMatches number in the recentRequiredMatches - we don't want to use the number of files we
    are EXPECTING
39     if (Int32.TryParse(RequiredMatches.TrimEnd('+'), out HttpWatchHandler.recentRequiredMatches_int)) {
40     } else { // Failed to parse the int
41        Report.Error("HttpWatch", "Invalid entry for RequiredMatches. Must be an int, optionally followed by a '+'");
42     }
43     HttpWatchHandler.recentURLFilter = URLFilter;
44     HttpWatchHandler.recentFileContent = RequestFinishedString;
45  }
```

FIG. 20A
2000

```
1    ///<private static int internal_ConfirmRequestsCompletedWithContent(string URLFilter, string RequiredMatches, string FileContent, int timeout_secs)
2    /// <summary>
3    /// Internal function that confirms that a certain number of requests have been completed, whose responses contain a certain string
4    /// </summary>
5    /// <param name="URLFilter">Only select requests that have a given string in the URL.</param>
6    /// <param name="RequiredMatches">Number of matches we are looking for</param>
7    /// <param name="FileContent">The string that is expected to be found inside response.</param>
8    /// <param name="timeout_secs">Seconds before reporting a failure. Defaults to 120s if 0 is entered.</param>
9    /// <returns>List of relevant entries</returns>
10   public static List<HttpWatch.Entry> internal_ConfirmRequestsCompletedWithContent(string URLFilter, string RequiredMatches, string FileContent, int timeout_secs)
11   {
12       List<HttpWatch.Entry> entry_list = new List<HttpWatch.Entry>();
13       if ( httpwatch_enabled == "true" && plugin.IsRecording) {
14
15           int completed_count = 0;
16           if (RequiredMatches == "-1") { // Simply report how many requests match the given filter
17               foreach (HttpWatch.Entry entry in plugin.Log.Entries) {
18                   //Report.Info("HttpWatch Request Status", entry.URL);
19                   if (entry.URL.Contains(URLFilter)
20                       && entry.IsComplete
21                       && entry.Content.Text != null
22                       && entry.Content.Text.Contains(FileContent)) {   // if it matches the filter and is Complete
23                           completed_count += 1;
24                           entry_list.Add(entry);}
25               }
26               // Commented out to allow more control. This simply returns the list, shouldn't report anything other than debug and error messages.
27               // Report.Info("HttpWatch", "found " + completed_count + " current completed matches for URL filter: " + URLFilter + " with content \""
28               + FileContent + "\"");
29               return entry_list;
30           } else if (RequiredMatches == "") {              // If they don't fill in RequiredMatches, treat it as 1+
31               RequiredMatches = "1+";
32               Report.Info("HttpWatch", "No value entered for RequiredMatches. Defaulting to 1+");
33           }
34           if (timeout_secs == 0) {  //Maximum searches for 120secs unless specified otherwise
35               timeout_secs = 120;
```

FIG. 20B
2000

```
36    completed_count = 0;
37    bool plus_flag = false;    // !! = in RequiredMatches
38    if (RequiredMatches.Contains("+")) {    //If we are checking for any matching requests to finish, not just to reach the counter...
39        plus_flag = true;
40    }
41
42    int RequiredMatches_int;
43    if (!Int32.TryParse(RequiredMatches.TrimEnd('+'), out RequiredMatches_int)) { //Get just the int from RequiredMatches. Must be an int, optionally followed by a '+'"}.
44        Report.Error("HttpWatch", "Invalid entry for RequiredMatches_int");
45    } else { //Failed to parse the int
46        // Set global values
47        if (RequiredMatches_int != 0) {
48            recentURLFilter = URLFilter;
49            recentRequiredMatches_int = RequiredMatches_int;
50            recentFileContent = FileContent;
51        }
52    }
53
54    int max_completed_count = 0;
55    int cycle_count = 0;
56    bool all_complete_flag = true;    //Flag to toggle in case all requests matching the filter are done.
57    Report.Debug("HttpWatch", "Searching for " + RequiredMatches + " matches for URL filter: " + URLFilter);
58    System.Diagnostics.Stopwatch stopwatch_timeout = new System.Diagnostics.Stopwatch();
59    bool first_request_stored_flag = false;
60    double first_match_start_time = 0;
61    string report_string;
62    stopwatch_timeout.Start();
63    do {
64        cycle_count += 1;
65
66        if (stopwatch_timeout.ElapsedMilliseconds > (timeout_secs*1000)) {    // If we have passed our timeout value
67            if (max_completed_count > RequiredMatches_int) { //If we found our needed count, it means some number were in progress
68                //Report.Warn("HttpWatch", "Found " + max_completed_count + " completed Requests of " + RequiredMatches +
69                //Report.LogHtml(ReportLevel.
70                Report.Warn("HttpWatch", "Found " + max_completed_count + " completed Requests of " + RequiredMatches + ",
71
```

FIG. 20C
2000

```
72   however one or more matching Request was still in progress");
73         } else { //If we didn't reach the count needed
                Report.Failure("HttpWatch", "Found only " + max_completed_count + " completed Requests of " + RequiredMatches +
74      " when the " + timeout_secs + "s timeout expired");
                Validate.IsTrue(false, "Found only " + max_completed_count + " completed Requests of " + RequiredMatches + " with
     URL / content " + URLFilter + " / " + FileContent + " when the " + timeout_secs + "s timeout expired");
75         }
76         break;
77      }
78      completed_count = 0;
79      all_complete_flag = true;
80      //For each entry in the current log
81      foreach (HttpWatch.Entry entry in plugin.Log.Entries) {
82         //Report.Info("HttpWatch Request Status", entry.URL);
83         if (entry.URL.Contains(URLFilter)) {
84            if (entry.isComplete) {
85               if (!first_request_stored_flag) {
86                  first_request_stored_flag = true;
87                  first_match_start_time = stopwatch_timeout.ElapsedMilliseconds/1000.0 - entry.Time;
88               }
89               if (entry.Content.Text != null
90                   && entry.Content.Text.Contains(FileContent)) {   //if it matches the Filter and isComplete and has the
     validation text
91                  completed_count += 1;
92                  //If the entry is not already stored in the list we return, then add it to the list
93                  bool match_flag = false;
94                  foreach (HttpWatch.Entry temp_entry in entry_list) {
95                     if (entry.URL == temp_entry.URL)
96                        match_flag = true;
97                  }
98                  if (match_flag == false)
99                     entry_list.Add(entry);
100                 if (completed_count > max_completed_count) { //If we got a new maximum count, but still less than
     Required... (to prevent duplicate logging)
101                    max_completed_count = completed_count;
102                    if (completed_count < RequiredMatches_int) { //If the count is not enough to complete our
     search, log the new current count
```

```
103              report_string = "Found " + max_completed_count + " completed " + URLFilter +
                 Requests of " + RequiredMatches + "; Cycling";
104
105              Report.Info("HttpWatch", report_string);
106
107          }
108          //Report.Info("HttpWatch Request Status", entry.IsComplete.ToString());
109      } else if (plus_flag) {    //If it matches and is NOT complete and is NOT complete and we care about more matching, set the flag to keep
110 looping
111              all_complete_flag = false;
112          }
113      }
114      Thread.Sleep(50);
115  } while (completed_count < RequiredMatches_int || !all_complete_flag);    //While we haven't reached our count AND all_complete is false,
116 re-loop
117      //We have finished
118      report_string = "Used " + cycle_count + " cycles over " + stopwatch_timeout.ElapsedMilliseconds/1000.0 + "s (" +
         Math.Round(cycle_count/(stopwatch_timeout.ElapsedMilliseconds/1000.0), 3) + "/s) to search";
119      report_string += "<br></br>Found " + completed_count + " matches for URL filter: " + SecurityElement.Escape(URLFilter) + ", " +
         RequiredMatches + " were needed.";
120      report_string += "<br></br>First matching request was started " + first_match_start_time + " seconds into cycling";
121      //Report.Info("HttpWatch", report_string);
122      Report.LogHtml(ReportLevel.Info, "HttpWatch", report_string);
123      //Report.Info("HttpWatch", "Found " + completed_count + " matches for URL filter: " + URLFilter + ", " + RequiredMatches + " were needed.");
124      return entry_list;
125  } else {
126      Report.Error("HttpWatch", "Not ConfirmingRequestsCompletedWithContent, HttpWatch is not enabled or is not actively recording. This can be
         the case when you run from a Jane Recording Module or Smart Folder without initializing HttpWatch.");
127      return entry_list;
128  }
```

FIG. 21A
2100

```
1    /// <summary>
2    /// Validates that (some URL containing URLFilter captured in the current HttpWatch log) contains (ValidationText). Gives the ability to set the action when the
     validation text is found.
3    /// </summary>
4    /// <param name="URLFilter">Filters any URLs returned. If blank, returns all files.</param>
5    /// <param name="ValidationText">Checks any returned files for this text. If blank, will print the first 500 chars of any files instead.</param>
6    /// <param name="ActionOnFind">Sets the action when the text is found. Valid options are "succeed" and "fail", defaults to succeed if no value is
     passed</param>
7    [UserCodeMethod]
8    public static void CheckFileContents(string URLFilter, string ValidationText, string ActionOnFind)
9    {
10       // Setting default value if no value is passed
11       if( ActionOnFind == "" ){
12           ActionOnFind = "succeed";
13           Report.LogHtml(ReportLevel.Info, "CheckFileContents", "No ActionOnFind set, so defaulting to succeed");
14       }
15       //HttpWatch.
16       if ( httpwatch_enabled == "true" ) {
17           if (ValidationText == "" ) {          // no Validation text is passed, shows FileContents instead.
18               Report.LogHtml(ReportLevel.Warn, "HttpWatch CheckFileContents", "CheckFileContents has no ValidationText. Calling
     'ShowFileContents' with same URLFilter and default maxLength(500).'' +
19               "<br><br>If you need more characters to be shown, call ShowFileContents(URLFilter, maxLength) explicitly");
20   //        Report.Warn("HttpWatch CheckFileContents", "CheckFileContents has no ValidationText. Calling 'ShowFileContents' with same URLFilter
     and default maxLength(500)." +
21   //        "<br><br>If you need more characters to be shown, call ShowFileContents(URLFilter, maxLength) explicitly");
22               ShowFileContents(URLFilter, 0);
23           }
24           //Once we find the data, set this to true
25           //Report.Info("HttpWatch Analysis", "Beginning check on CSVs");
26           foreach (HttpWatch.Entry entry in plugin.Log.Entries) {
27               //is we are checking against this entry,
28               if (entry.URL.Contains(URLFilter)) {
29                   if (entry.URL.Contains(ValidationText)) {
30                       if(ActionOnFind == "succeed"){
31                           Report.LogHtml(ReportLevel.Success, "CheckFileContents", "Found: " + SecurityElement.Escape(ValidationText));
32   +" in Request URL:<br></br>Request URL: " + SecurityElement.Escape(entry.URL));}
```

FIG. 21B
2100

```
33      else if (ActionOnFind == "fail") {
34          Report.LogHtml(ReportLevel.Failure, "CheckFileContents", "Found: " + SecurityElement.Escape(ValidationText) +
35  " in Request URL<br></br>Request URL: " + SecurityElement.Escape(entry.URL));
36      } else {
37          Report.LogHtml(ReportLevel.Failure, "CheckFileContents", "Your Action: " + ActionOnFind + " is not defined,
    some valid values are succeed or fail");
38      }
39      //Check if ValidationText is in the given Content.Text
40      if (entry.Content.Text != null
41          && entry.Content.Text.Contains(ValidationText)) {
42          if (ActionOnFind == "succeed") {
43              Report.LogHtml(ReportLevel.Success, "CheckFileContents", "Found: " + SecurityElement.Escape(ValidationText)
    + " in Request URL<br></br>Request URL: " + SecurityElement.Escape(entry.URL));
44          }
45          else if (ActionOnFind == "fail") {
46              Report.LogHtml(ReportLevel.Failure, "CheckFileContents", "Found: " + SecurityElement.Escape(ValidationText)
    + " in Request URL<br></br>Request URL: " + SecurityElement.Escape(entry.URL));
47          } else {
48              Report.LogHtml(ReportLevel.Failure, "CheckFileContents", "Your Action: " + ActionOnFind + " is not defined,
    some valid values are succeed or fail");
49          }
50          return;
51      }
52      //Report.Info("HttpWatch Analysis", entry.URL + ": " + entry.Content.Text.ToString())
53      //entry.Content.Text.ToString()
54      
55      if (ActionOnFind == "succeed") {
56          Report.LogHtml(ReportLevel.Info, "HttpWatch CheckFileContents", "Failed to find Text: " + SecurityElement.Escape(ValidationText) + " in
    Request URL: \"" + SecurityElement.Escape(URLFilter) + "\"; writing files to Report for comparison");
57          ShowFileContents(URLFilter);
58          Report.LogHtml(ReportLevel.Failure, "HttpWatch CheckFileContents", "Failed to find Text: " + SecurityElement.Escape(ValidationText) +
59  " in Request URL<br></br>Request URL: " + SecurityElement.Escape(URLFilter));
60      }
61      else if (ActionOnFind == "fail") {
62          Report.LogHtml(ReportLevel.Success, "CheckFileContents", "Did not find: " + SecurityElement.Escape(ValidationText))
```

FIG. 21C
2100

```
63    } else {
64        Report.LogHtml(ReportLevel.Failure, "CheckFileContents", "Your Action: " + ActionOnFind + " is not defined, some valid values are succeed or fail");
65    }
66  } else {
67    Report.Info("HttpWatch CheckFileContents", "Not CheckingFileContents; HttpWatch is not enabled. This can be the case when you run from a lone module.");
68  }
69 }
```

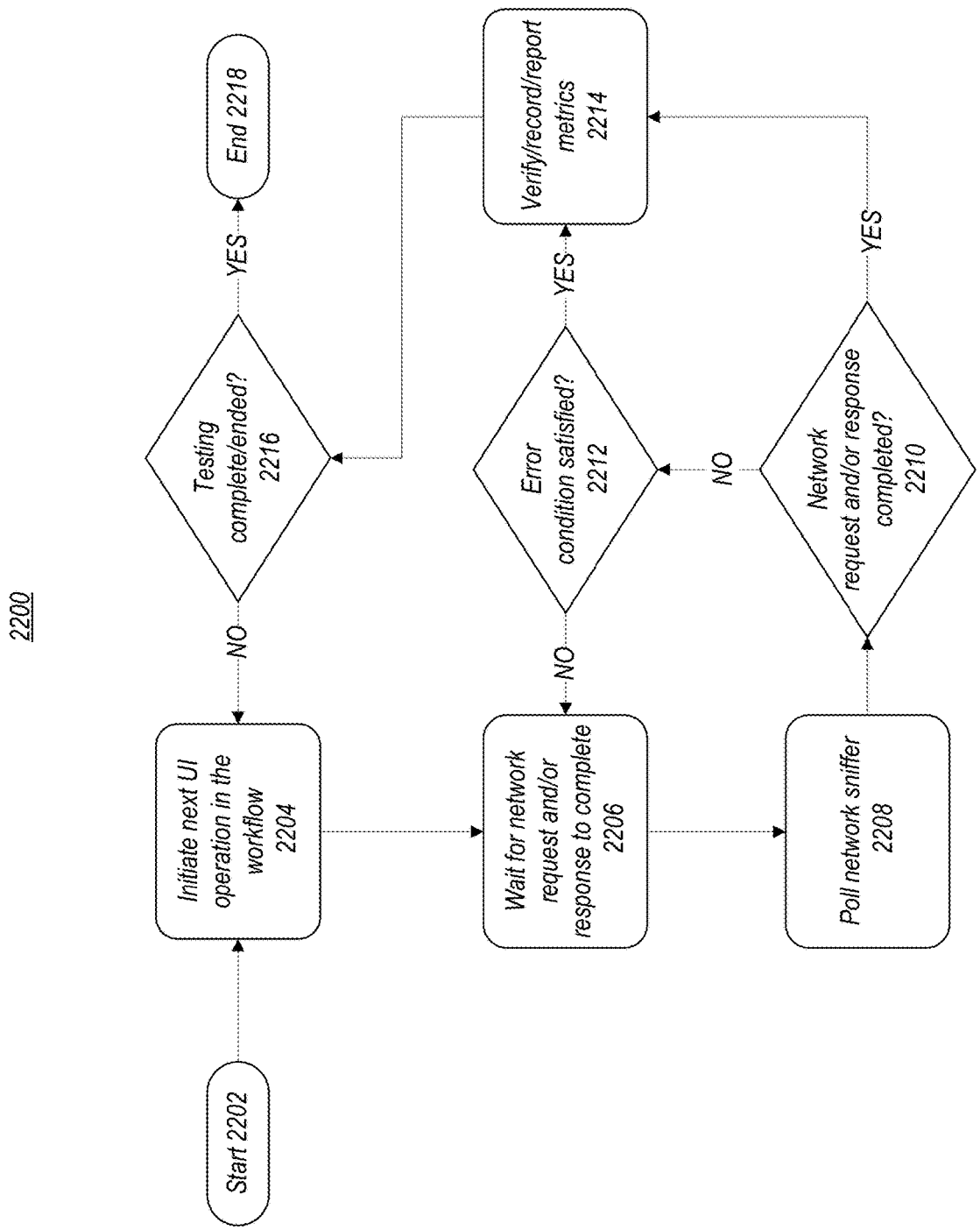

Initiate a first operation in a software under test (SUT) with a user interface automation tool (UIAT) during implementation of a workflow to evaluate the SUT, wherein the first operation comprises one of a plurality of operations in the workflow for performance by the SUT during evaluation of the SUT, and wherein the UIAT initiates the first operation via a user interface of the SUT
2302

↓

Start a timer in response to initiation of a first operation in the SUT by the UIAT
2304

↓

Monitor operation of the user interface to identify a response associated with performance of the first operation by the SUT
2306

↓

Determine UI completion data based on the response identified from the user interface and associated with completion of the first operation by the SUT, wherein the UI completion data comprises an indication that the first operation has been performed by the SUT
2308

↓

Record network traffic associated with the first operation in a test digest, wherein the test digest comprises one or more storage locations on one or more computer-readable media
2310

↓

Monitor network traffic between the SUT and a test server to detect specific network traffic associated with completion of the first operation by the SUT, wherein the specific network traffic associated with completion of the first operation by the SUT comprises one or more of a network request and a network response
2312

↓

Determine network completion data based on detection of the specific network traffic associated with completion of the first operation by the SUT
2314

2300 ⇘  FIG. 23B

```
Determine network completion data based on detection of the specific network traffic associated with
completion of the first operation by the SUT
2314
```

↓

```
Stop the timer in response to determination of the UI completion data and the network completion data
2316
```

↓

```
Record, in the test digest, a response time for the first operation in the SUT based on an amount of time
indicated by the timer
2318
```

↓

```
Verify the UI completion data based on comparison of the UI completion data to predetermined UI
completion data
2320
```

↓

```
Record verification of the UI completion data in the test digest
2322
```

↓

```
Verify the network completion data based on comparison of the network completion data to
predetermined network completion data
2324
```

↓

```
Record verification of the network completion data in the test digest
2326
```

↓

```
Initiate a second operation in the SUT with the UIAT based on verification of the UI completion data and
the network completion data, wherein the second operation comprises one of the plurality of operations
in the workflow for performance by the SUT during evaluation of the SUT, and wherein the UIAT initiates
the second operation via the user interface of the SUT
2328
```

TECHNIQUES FOR AUTOMATED SOFTWARE TESTING

CROSS-REFERENCE TO RELATED APPLICATIONS

This application claims the benefit of priority under 35 U.S.C. § 119(e) to U.S. Provisional Application Ser. No. 62/961,302 filed Jan. 15, 2020, the entirety of which is incorporated herein by reference.

This application claims the benefit of priority under 35 U.S.C. § 119(e) to U.S. Provisional Application Ser. No. 62/977,379 filed Feb. 16, 2020, the entirety of which is incorporated herein by reference.

SUMMARY

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

Various embodiments described herein may include an apparatus comprising a processor and a storage to store instructions that, when executed by the processor, cause the processor to perform operations comprising one or more of: initiate a first operation in a software under test (SUT) with a user interface automation tool (UIAT) during implementation of a workflow to evaluate the SUT, wherein the first operation comprises one of a plurality of operations in the workflow for performance by the SUT during evaluation of the SUT, and wherein the UIAT initiates the first operation via a user interface of the SUT; start a timer in response to initiation of the first operation in the SUT by the UIAT; monitor operation of the user interface to identify a response associated with performance of the first operation by the SUT; determine UI completion data based on the response identified from the user interface and associated with completion of the first operation by the SUT, wherein the UI completion data comprises an indication that the first operation has been performed by the SUT; record network traffic associated with the first operation in a test digest, wherein the test digest comprises one or more storage locations on one or more computer-readable media; monitor network traffic between the SUT and a test server to detect specific network traffic associated with completion of the first operation by the SUT, wherein the specific network traffic associated with completion of the first operation by the SUT comprises one or more of a network request and a network response; determine network completion data based on detection of the specific network traffic associated with completion of the first operation by the SUT; stop the timer in response to determination of the UI completion data and the network completion data; record, in the test digest, a response time for the first operation in the SUT based on an amount of time indicated by the timer; verify the UI completion data based on comparison of the UI completion data to predetermined UI completion data; record verification of the UI completion data in the test digest; verify the network completion data based on comparison of the network completion data to predetermined network completion data; record verification of the network completion data in the test digest; and initiate a second operation in the SUT with the UIAT based on verification of the UI completion data and the network completion data, wherein the second operation comprises one of the plurality of operations in the workflow for performance by the SUT during evaluation of the SUT, and wherein the UIAT initiates the second operation via the user interface of the SUT.

In some embodiments, the processor is caused to perform operations comprising one or more of: start a second timer in response to initiation of the second operation in the SUT with the UIAT; record network traffic associated with the second operation in the test digest; monitor network traffic between the SUT and a test server to detect specific network traffic associated with performance of the second operation by the SUT; determine second network completion data based on detection of the specific network traffic associated with performance of the second operation by the SUT; stop the second timer in response to determination of the second network completion data; and record, in the test digest, a response time for the second operation in the SUT based on an amount of time indicated by the second timer.

In some such embodiments, the processor is caused to perform operations comprising one or more of: analyze the network traffic associated with the second operation to determine an error associated with performance of the second operation by the SUT; determine the error associated with performance of the second operation by the SUT is not detrimental to evaluation of the SUT via the workflow; and initiate a third operation in the SUT with the UIAT based on determination the error is not detrimental to evaluation of the SUT via the workflow, wherein the third operation comprises one of the plurality of operations in the workflow for performance by the SUT during evaluation of the SUT.

In various such embodiments, the processor is caused to perform operations comprising record an indication of the error and data associated with the error in the test digest based on determination the error associated with performance of the second operation by the SUT is not detrimental to evaluation of the SUT via the workflow.

In one or more embodiments, the processor is caused to perform operations comprising one or more of: analyze the network traffic associated with the second operation to determine an error associated with performance of the second operation by the SUT; determine the error associated with performance of the second operation by the SUT is detrimental to evaluation of the SUT via the workflow; and end implementation of the workflow based on determination the error associated with performance of the second operation by the SUT is detrimental to evaluation of the SUT via the workflow.

In one or more such embodiments, the processor is caused to perform operations comprising present an indication of the error and data associated with the error via a user interface based on determination the error associated with performance of the second operation by the SUT is detrimental to evaluation of the SUT via the workflow.

In several embodiments, the processor is caused to perform operations comprising one or more of: analyze the network traffic associated with the first operation to determine an error associated with performance of the first operation by the SUT; record the error associated with performance of the first operation by the SUT in the test digest; determine the error associated with performance of the first operation by the SUT is not detrimental to the evaluation of the SUT via the workflow; and initiate the second operation in the SUT with the UIAT based on determination the error is not detrimental to evaluation of the SUT via the workflow.

In various embodiments, the user interface of the SUT comprises a graphical user interface (GUI) and the response identified from the user interface, associated with completion of the first operation by the SUT, and used to determine the network completion data comprising removal, from the user interface, of a progress indicator that corresponds to loading data associated with execution of the first operation by the SUT.

In many embodiments, the user interface of the SUT comprises a graphical user interface (GUI), the UI completion data comprises an image of a current configuration of the GUI, the predetermined UI completion data comprising an image of a target configuration of the GUI. In many such embodiments, the processor is caused to perform operations comprising verify the UI completion data based on comparison of the UI completion data to predetermined UI completion data that indicates the image of the current configuration of the GUI matches the image of the target configuration of the GUI.

In some embodiments, the specific network traffic associated with completion of the first operation by the SUT comprises one or more of a first HTTP message sent from the SUT to the test server and a second HTTP message sent from the test server to the SUT. Various embodiments described herein may include a computer-implemented method, comprising one or more of: initiating a first operation in a software under test (SUT) with a user interface automation tool (UIAT) during implementation of a workflow to evaluate the SUT, wherein the first operation comprises one of a plurality of operations in the workflow for performance by the SUT during evaluation of the SUT, and wherein the UIAT initiates the first operation via a user interface of the SUT; starting a timer in response to initiation of the first operation in the SUT by the UIAT; monitoring operation of the user interface to identify a response associated with performance of the first operation by the SUT; determining UI completion data based on the response identified from the user interface and associated with completion of the first operation by the SUT, wherein the UI completion data comprises an indication that the first operation has been performed by the SUT; recording network traffic associated with the first operation in a test digest, wherein the test digest comprises one or more storage locations on one or more computer-readable media; monitoring network traffic between the SUT and a test server to detect specific network traffic associated with completion of the first operation by the SUT, wherein the specific network traffic associated with completion of the first operation by the SUT comprises one or more of a network request and a network response; determining network completion data based on detection of the specific network traffic associated with completion of the first operation by the SUT; stopping the timer in response to determination of the UI completion data and the network completion data; recording, in the test digest, a response time for the first operation in the SUT based on an amount of time indicated by the timer; verifying the UI completion data based on comparison of the UI completion data to predetermined UI completion data; recording verification of the UI completion data in the test digest; verifying the network completion data based on comparison of the network completion data to predetermined network completion data; recording verification of the network completion data in the test digest; and initiating a second operation in the SUT with the UIAT based on verification of the UI completion data and the network completion data, wherein the second operation comprises one of the plurality of operations in the workflow for performance by the SUT during evaluation of the SUT, and wherein the UIAT initiates the second operation via the user interface of the SUT. In some embodiments, the computer-implemented method comprises one or more of: starting a second timer in response to initiation of the second operation in the SUT with the UIAT; recording network traffic associated with the second operation in the test digest; monitoring network traffic between the SUT and a test server to detect specific network traffic associated with performance of the second operation by the SUT; determining second network completion data based on detection of the specific network traffic associated with performance of the second operation by the SUT; stopping the second timer in response to determination of the second network completion data; and recording, in the test digest, a response time for the second operation in the SUT based on an amount of time indicated by the second timer.

In some such embodiments, the computer-implemented method comprises one or more of: analyzing the network traffic associated with the second operation to determine an error associated with performance of the second operation by the SUT; determining the error associated with performance of the second operation by the SUT is not detrimental to evaluation of the SUT via the workflow; and initiating a third operation in the SUT with the UIAT based on determination the error is not detrimental to evaluation of the SUT via the workflow, wherein the third operation comprises one of the plurality of operations in the workflow for performance by the SUT during evaluation of the SUT.

In various such embodiments, the computer-implemented method comprises recording an indication of the error and data associated with the error in the test digest based on determination the error associated with performance of the second operation by the SUT is not detrimental to evaluation of the SUT via the workflow.

In one or more embodiments, the computer-implemented method includes one or more of: analyzing the network traffic associated with the second operation to determine an error associated with performance of the second operation by the SUT; determining the error associated with performance of the second operation by the SUT is detrimental to evaluation of the SUT via the workflow; and ending implementation of the workflow based on determination the error associated with performance of the second operation by the SUT is detrimental to evaluation of the SUT via the workflow.

In one or more such embodiments, the computer-implemented method comprises presenting an indication of the error and data associated with the error via a user interface based on determination the error associated with performance of the second operation by the SUT is detrimental to evaluation of the SUT via the workflow.

In several embodiments, the computer-implemented comprises one or more of: analyzing the network traffic associated with the first operation to determine an error associated with performance of the first operation by the SUT; recording the error associated with performance of the first operation by the SUT in the test digest; determining the error associated with performance of the first operation by the SUT is not detrimental to the evaluation of the SUT via the workflow; and initiating the second operation in the SUT with the UIAT based on determination the error is not detrimental to evaluation of the SUT via the workflow.

In various embodiments, the user interface of the SUT comprises a graphical user interface (GUI) and the response identified from the user interface, associated with completion of the first operation by the SUT, and used to determine the network completion data comprises removal, from the user interface, of a progress indicator that corresponds to loading data associated with execution of the first operation by the SUT.

In many embodiments, the user interface of the SUT comprises a graphical user interface (GUI), the UI completion data comprises an image of a current configuration of the GUI, the predetermined UI completion data comprising an image of a target configuration of the GUI. In many such embodiments, the computer-implemented method comprises verifying the UI completion data based on comparison of the UI completion data to predetermined UI completion data that indicates the image of the current configuration of the GUI matches the image of the target configuration of the GUI.

In some embodiments, the specific network traffic associated with completion of the first operation by the SUT comprises one or more of a first HTTP message sent from the SUT to the test server and a second HTTP message sent from the test server to the SUT Various embodiments described herein may include a computer-program product tangibly embodied in a non-transitory machine-readable storage medium, the computer-program product including instructions operable to cause a processor to perform operations comprising one or more of: initiate a first operation in a software under test (SUT) with a user interface automation tool (UIAT) during implementation of a workflow to evaluate the SUT, wherein the first operation comprises one of a plurality of operations in the workflow for performance by the SUT during evaluation of the SUT, and wherein the UIAT initiates the first operation via a user interface of the SUT; start a timer in response to initiation of the first operation in the SUT by the UIAT; monitor operation of the user interface to identify a response associated with performance of the first operation by the SUT; determine UI completion data based on the response identified from the user interface and associated with completion of the first operation by the SUT, wherein the UI completion data comprises an indication that the first operation has been performed by the SUT; record network traffic associated with the first operation in a test digest, wherein the test digest comprises one or more storage locations on one or more computer-readable media; monitor network traffic between the SUT and a test server to detect specific network traffic associated with completion of the first operation by the SUT, wherein the specific network traffic associated with completion of the first operation by the SUT comprises one or more of a network request and a network response; determine network completion data based on detection of the specific network traffic associated with completion of the first operation by the SUT; stop the timer in response to determination of the UI completion data and the network completion data; record, in the test digest, a response time for the first operation in the SUT based on an amount of time indicated by the timer; verify the UI completion data based on comparison of the UI completion data to predetermined UI completion data; record verification of the UI completion data in the test digest; verify the network completion data based on comparison of the network completion data to predetermined network completion data; record verification of the network completion data in the test digest; and initiate a second operation in the SUT with the UIAT based on verification of the UI completion data and the network completion data, wherein the second operation comprises one of the plurality of operations in the workflow for performance by the SUT during evaluation of the SUT, and wherein the UIAT initiates the second operation via the user interface of the SUT.

In some embodiments, the computer-program product includes instructions operable to cause a processor to perform operations comprising one or more of: start a second timer in response to initiation of the second operation in the SUT with the UIAT; record network traffic associated with the second operation in the test digest; monitor network traffic between the SUT and a test server to detect specific network traffic associated with performance of the second operation by the SUT; determine second network completion data based on detection of the specific network traffic associated with performance of the second operation by the SUT; stop the second timer in response to determination of the second network completion data; and record, in the test digest, a response time for the second operation in the SUT based on an amount of time indicated by the second timer.

In some such embodiments, the computer-program product includes instructions operable to cause a processor to perform operations comprising one or more of: analyze the network traffic associated with the second operation to determine an error associated with performance of the second operation by the SUT; determine the error associated with performance of the second operation by the SUT is not detrimental to evaluation of the SUT via the workflow; and initiate a third operation in the SUT with the UIAT based on determination the error is not detrimental to evaluation of the SUT via the workflow, wherein the third operation comprises one of the plurality of operations in the workflow for performance by the SUT during evaluation of the SUT.

In various such embodiments, the computer-program product includes instructions operable to cause a processor to perform operations comprising record an indication of the error and data associated with the error in the test digest based on determination the error associated with performance of the second operation by the SUT is not detrimental to evaluation of the SUT via the workflow.

In one or more embodiments, the computer-program product includes instructions operable to cause a processor to perform operations comprising one or more of: analyze the network traffic associated with the second operation to determine an error associated with performance of the second operation by the SUT; determine the error associated with performance of the second operation by the SUT is detrimental to evaluation of the SUT via the workflow; and end implementation of the workflow based on determination the error associated with performance of the second operation by the SUT is detrimental to evaluation of the SUT via the workflow.

In one or more such embodiments, the computer-program product includes instructions operable to cause a processor to perform operations comprising present an indication of the error and data associated with the error via a user interface based on determination the error associated with performance of the second operation by the SUT is detrimental to evaluation of the SUT via the workflow.

In several embodiments, the computer-program product includes instructions operable to cause a processor to perform operations comprising one or more of: analyze the network traffic associated with the first operation to determine an error associated with performance of the first operation by the SUT; record the error associated with performance of the first operation by the SUT in the test digest; determine the error associated with performance of the first operation by the SUT is not detrimental to the evaluation of the SUT via the workflow; and initiate the second operation in the SUT with the UIAT based on determination the error is not detrimental to evaluation of the SUT via the workflow.

In various embodiments, the user interface of the SUT comprises a graphical user interface (GUI) and the response identified from the user interface, associated with completion of the first operation by the SUT, and used to determine the network completion data comprising removal, from the user interface, of a progress indicator that corresponds to loading data associated with execution of the first operation by the SUT.

In many embodiments, the user interface of the SUT comprises a graphical user interface (GUI), the UI completion data comprises an image of a current configuration of the GUI, the predetermined UI completion data comprising an image of a target configuration of the GUI. In many such embodiments, the computer-program product includes instructions operable to cause a processor to perform operations comprising verify the UI completion data based on comparison of the UI completion data to predetermined UI completion data that indicates the image of the current configuration of the GUI matches the image of the target configuration of the GUI.

In some embodiments, the specific network traffic associated with completion of the first operation by the SUT comprises one or more of a first HTTP message sent from the SUT to the test server and a second HTTP message sent from the test server to the SUT. The foregoing, together with other features and embodiments, will become more apparent upon referring to the following specification, claims, and accompanying drawings.

BRIEF DESCRIPTION OF THE DRAWINGS

The present disclosure is described in conjunction with the appended figures:

FIGS. 18-21C illustrate codes snippets for exemplary implementations of various aspects of the logic flow of FIG. 17.

FIG. 22 illustrates a second exemplary logic flow for a software testing system, according to some embodiments of the present technology.

FIGS. 23A and 23B illustrate a third exemplary logic flow for a software testing system, according to some embodiments of the present technology.

DETAILED DESCRIPTION

Figure 1:
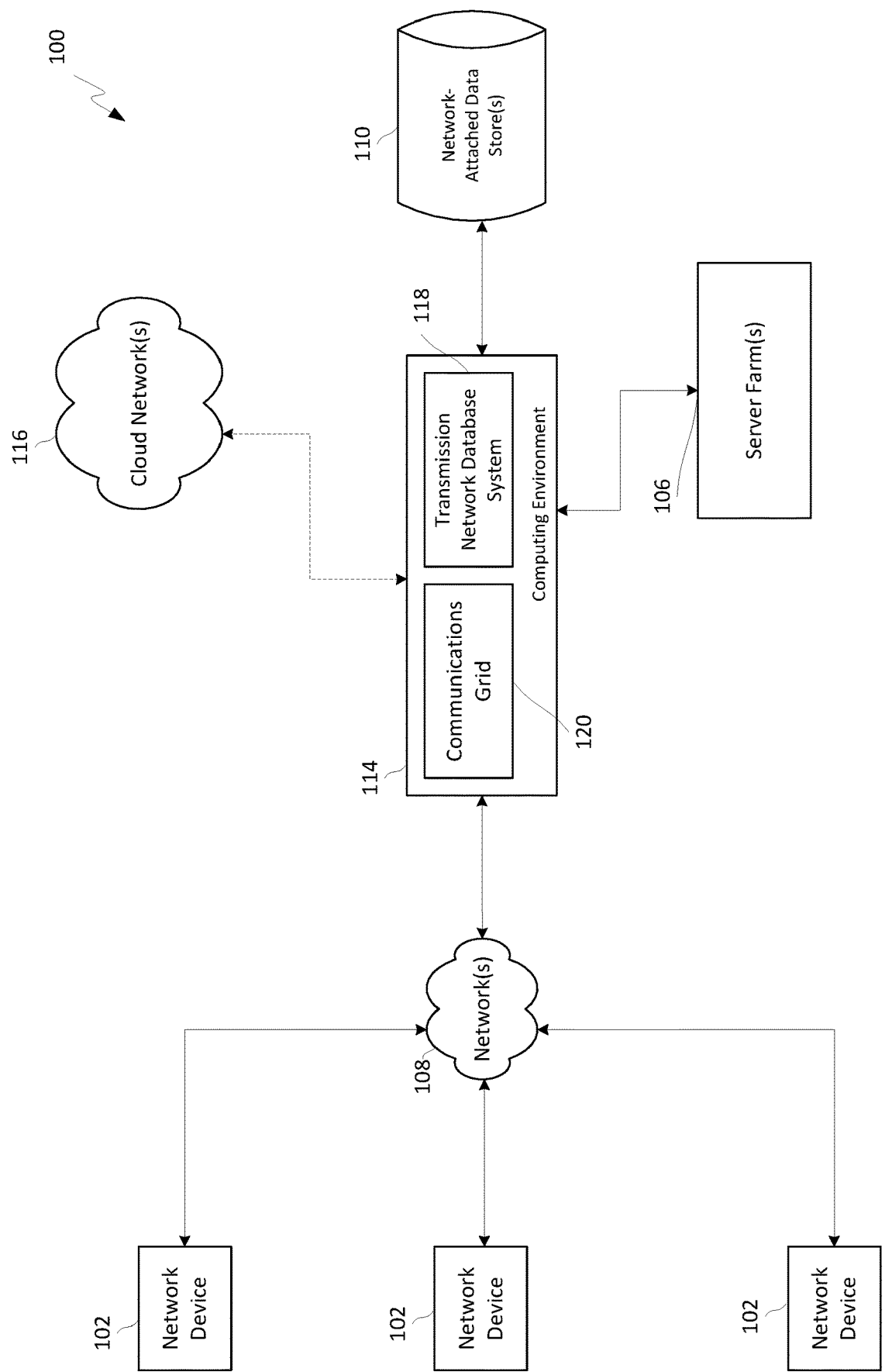
FIG. 1 illustrates a block diagram that provides an illustration of the hardware components of a computing system, according to some embodiments of the present technology.

Various embodiments are generally directed to techniques for automated software testing, such as by verifying operations are complete based on user interface and/or network traffic indications, for instance. Some embodiments are particularly directed to utilizing a network sniffer to detect specific network traffic to verify completion of network requests and/or responses associated with an operation included in a workflow for performance by a software under test (SUT). As will be described in more detail below, in many embodiments, the detection of specific network traffic may be used to accurately time operation durations and/or efficiently perform workflows to evaluate the SUT. These and other embodiments are described and claimed.

Some challenges facing automated software testing include lack of a reliable indication via the user interface (UI) that a step or operation has completed. For example, a 'busy' or 'completed' indication may appear too briefly to consistently detect. In another example, a value or element may be inaccessible via the UI, such as in a canvas container (i.e., a container for holding various drawing elements such as lines, shapes, text, frames containing other elements, and the like). In yet another example, raw data (e.g., network data) is not intended to be viewed in the UI presentation layer. These and other issues can hinder the ability to achieve accurate timings, consistent flow control, and/or data validation.

Additionally, utilizing fixed delays between UI operations in an effort to allow operations to complete before advancing in a workflow fails to resolve these issues. For example, fixed delays may skew timings due to the timer being stopped based on a fixed delay and not based on the application (e.g., SUT) completing the operation. In another example, fixed delays may cause untimely and inefficient workflow implementation (i.e., untimely and inefficient execution of a workflow), such as when operations complete before the fixed delay concludes, yet implementation of the workflow does not continue until after the fixed delay. Conversely, an operation that takes longer than the fixed delay can cause implementation of a workflow to fail or run differently than intended (e.g., skew results). Relying on validation processes performed after completion of a workflow, rather than in real time, to detect improper operation also results in untimely and inefficient workflow implementation. These and other factors may result in software testing systems with excessive delays, limited applicability, and poor adaptability. Such limitations can drastically reduce the usability and accuracy of the software testing systems, contributing to inefficient systems, devices, and techniques.

Still further, utilizing image validation to determine whether operations are complete before advancing in a workflow has several limitations and drawbacks. Some of the limitations of image validation include but are not limited to the following. Completion indicators appearing and disappearing before they can be detected by the UI automation tool. Visual inconsistencies preventing image validation from even being an option. Slowness in verification. Failure to verify based on image variation. False verification due to imprecise image verification criteria, which may be due to attempts to avoid failed verification.

In light of the above challenges, several embodiments described herein include software test system (STS) that utilizes a network sniffer to determine when operations of a SUT initiated by a user interface automation tool (UIAT) have completed. In various embodiments, a network sniffer may comprise software for intercepting, analyzing, and/or logging communications for application-layer protocols (e.g., FTP, SMTP, POP3, IMAP, HTTPS, HTTP and SSH). In many embodiments, the use of sniffed network traffic with UI automation may be integrated into the workflow in real time (or near-real time). These and other features may allow the STS to precisely record timings and avoid adding fixed delays for the workflow to consistently function. For example, sniffing of network traffic in real time for specific network traffic associated with completion of an operation by the SUT can be used to determine when the operation is finished/completed regardless of whether there is an UI indication of the operation's completion and/or detection thereof, which cannot be achieved if network traffic is replayed and/or only analyzed after workflow completion. In many embodiments, accurate and real-time determination of completion times allows exact and reliable timing of operations (e.g., for end-user actions in a UI application) and/or quick and consistent execution of a workflow to test software, leading to improved workflows. The improved workflow for UI-driven test automation may apply to functional, automation, and/or performance testers. Further, one or more STSs described herein can facilitate comprehensive validation of live test data, such as by using all content returned for verification.

In several embodiments, network traffic may be recorded and/or monitored. For instance, network traffic, or characteristics thereof, may be stored in one or more computer-readable media (e.g., one or more of main memory, disk memory, flash memory, caches, registers, system memory, random access memory). In many such instances, the one or more computer-readable media may be collectively referred to as a test digest. In various embodiments, captured network traffic (e.g., traffic stored in the test digest) may be used to validate the accuracy of sent and received data in real-time. In one or more embodiments, the process of integrating sniffed network traffic with UI automation tools can significantly improve one or more of flow control, timing, and validation. In some embodiments, one or more portions of SUT may be implemented by a test server. For example, the SUT may include an application hosted by the test server and/or an interface for interacting with the application, such as via a network. In some such examples, the interface for interacting with the application may be via a network access application (e.g., a web browser) implemented by a client.

More generally, accurate timings (e.g., how long an operation takes to complete) may be important for software performance testing and engineering. Quick and consistent flow control can be crucial when automating software testing. In various embodiments, flow control may refer to the steps that a UIAT uses to perform the desired operations against the SUT (e.g., application under test). Several embodiments may additionally, or alternatively, verify and/or validate request and/or response data. Further, one or more embodiments may allow a workflow to be modified based on the data that is received in a client-network intercommunication, which would not be possible if simulated traffic that was designated before testing began was used.

In some embodiments, the UIAT may be used to interact with a client UI that sends requests to an application server. A network sniffer may be used to determine when to progress through a workflow based on various criteria, such as data transmission and/or data validation (e.g., with the application server). In several such embodiments, the application server may execute the SUT, such as in response to commands provided by the UIAT (e.g., via a browser application). In other such embodiments, the STS may execute the SUT. In some embodiments, the application server may be the same or similar to a test server. In many embodiments, the STS may simulate one or more aspects (e.g., external data/interactions) for testing purposes. For example, STS may include, or be built upon, a logic platform, such as a computing platform/framework/environment for statistical analyses, that allows actual and/or simulated communication/interaction with external agents. In such examples, one or more aspects of the network, application server, and/or test server may be simulated.

Many embodiments herein may protect the STS from advancing through a UI-workflow too quickly (e.g., test a result of an operation before the operation has completed) by identifying and/or waiting for predetermined network traffic to complete. Additionally, this can ensure consistent and reliable actions (e.g., start/stop operations, data detection, data monitoring, etcetera). Several embodiments herein may prevent excessive delays to wait for necessary network requests to complete, thereby reducing the amount of time it takes to implement a workflow (i.e., execution of a workflow). For instance, fixed delays may have a safety factor of buffer time built-in to prevent premature operations. Various embodiments herein may detect changes to network traffic profiles driven from the Client, which can reduce the need of external input (e.g., user input) for the validation of tests.

In these and other ways, components described here may provide techniques to improve user interface automation, resulting in increased efficiency, decreased computational cost, and/or reduced resource requirements, in an accurate, dynamic, and scalable manner, resulting in several technical effects and advantages over conventional computer technology, including increased capabilities and improved adaptability. In various embodiments, one or more of the aspects, techniques, and/or components described herein may be implemented in a practical application via one or more computing devices, and thereby provide additional and useful functionality to the one or more computing devices, resulting in more capable, better functioning, and improved computing devices. Further, one or more of the aspects, techniques, and/or components described herein may be utilized to improve the technical field of software testing, user interface automation, timing, workflow implementation, and/or the like.

In several embodiments, components described herein may provide specific and particular manners of determining when operations (e.g., an operation initiated by the UIAT and executed by the SUT) are completed. In multiple embodiments, the specific and particular manner of determining when an operation is complete may include detecting specific network traffic associated with completion of the operation (i.e., network completion data). In many embodiments, one or more of the components described herein may be implemented as a set of rules that improve computer-related technology by allowing a function not previously performable by a computer that enables an improved technological result to be achieved. For example, the function allowed may include integrating network sniffing with UI automation to reliably determine when an operation has completed.

With general reference to notations and nomenclature used herein, portions of the detailed description that follows may be presented in terms of program procedures executed by a processor of a machine or of multiple networked machines. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical communications capable of being stored, transferred, combined, compared, and otherwise manipulated. It proves convenient at times, principally for reasons of common usage, to refer to what is communicated as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include machines selectively activated or configured by a routine stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will appear from the description given.

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional operations not included in a figure. A process may correspond to a method, a function, a procedure, a subroutine, a subprogram, etc. When a process corresponds to a function, its termination can correspond to a return of the function to the calling function or the main function.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

Systems depicted in some of the figures may be provided in various configurations. In some embodiments, the systems may be configured as a distributed system where one or more components of the system are distributed across one or more networks in a cloud computing system.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
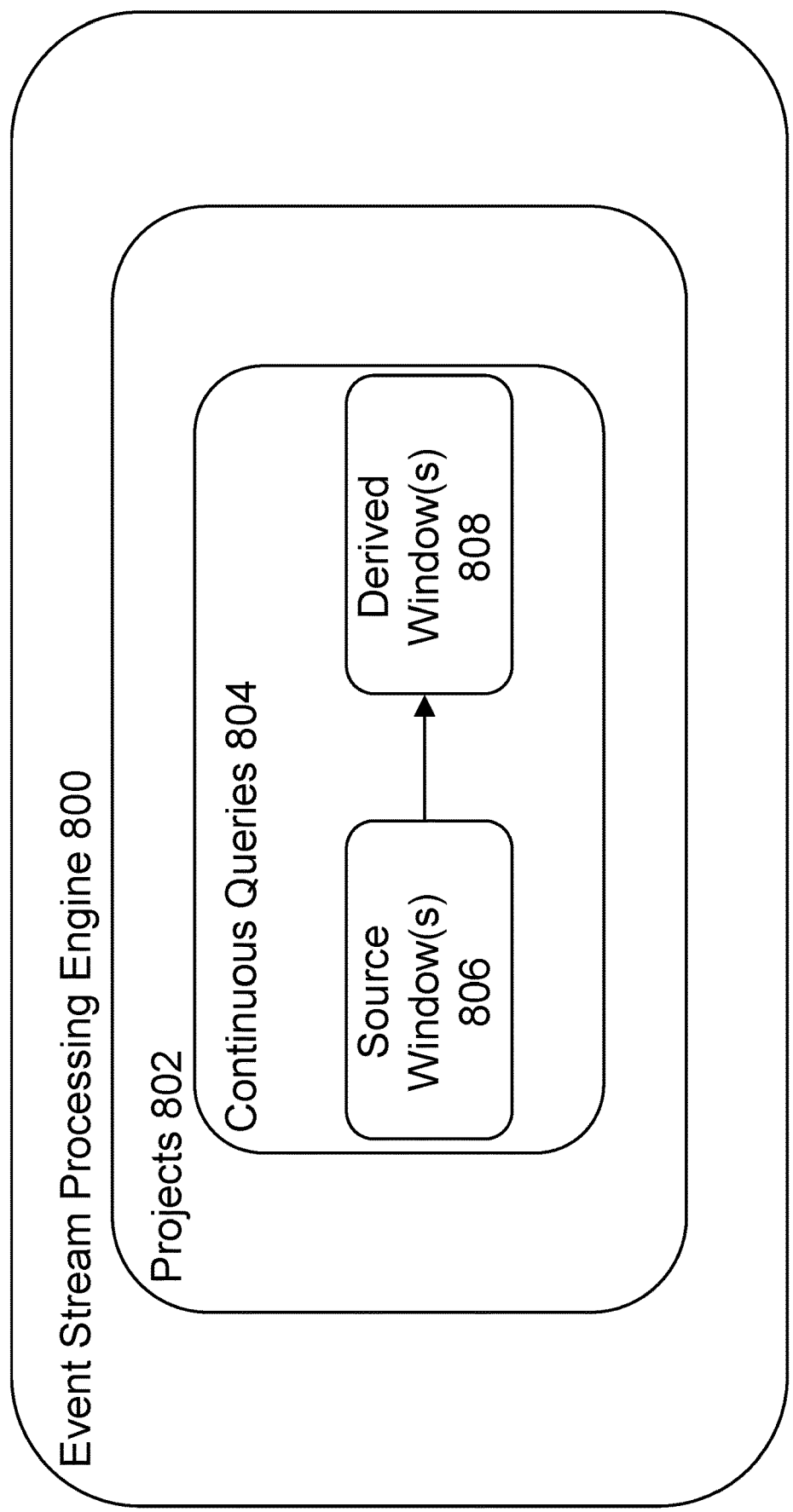
FIG. 8 illustrates a block diagram including components of an Event Stream Processing Engine (ESPE), according to embodiments of the present technology.
Figure 9:
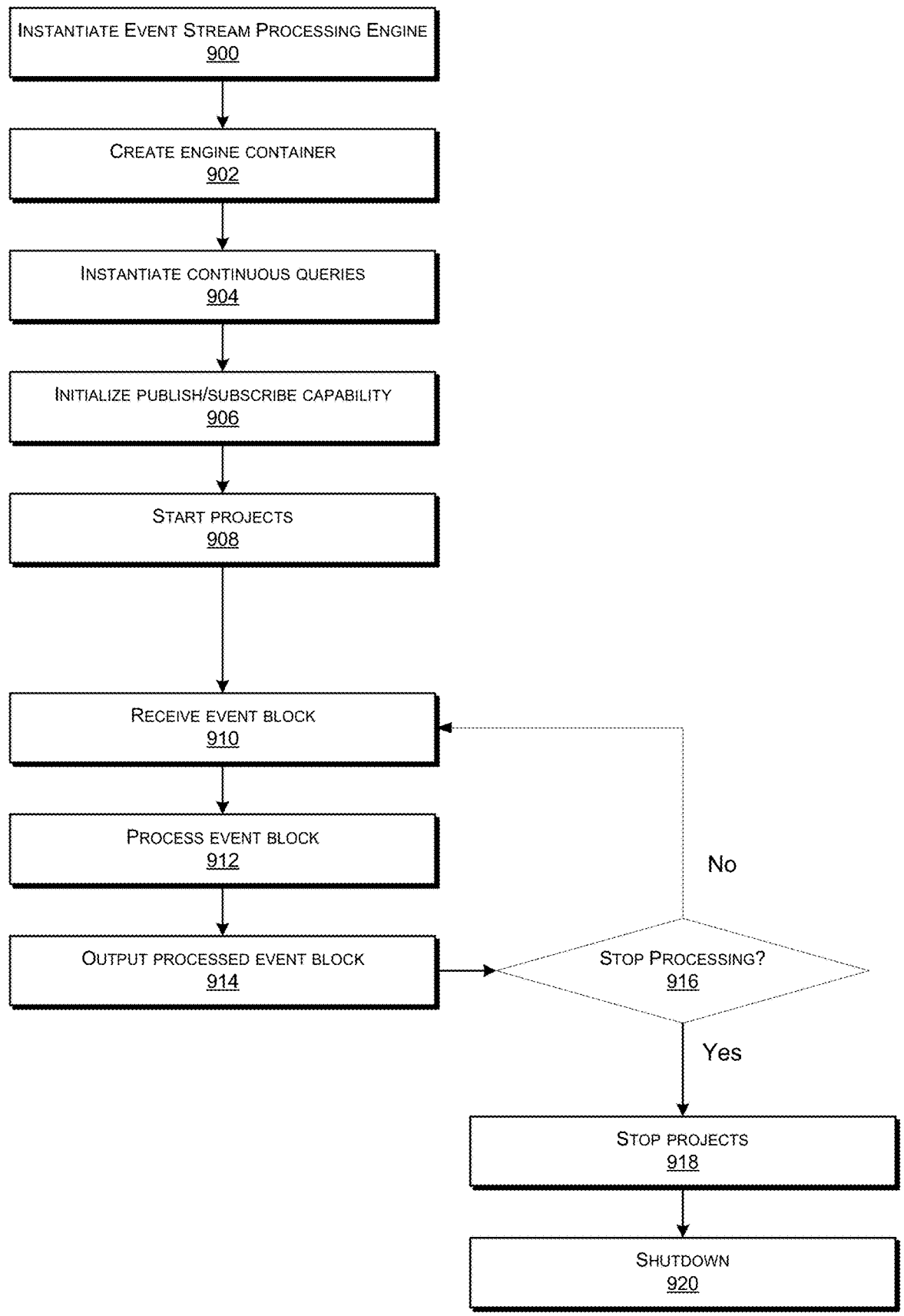
FIG. 9 illustrates a flow chart showing an example process including operations performed by an event stream processing engine, according to some embodiments of the present technology.
Figure 10:
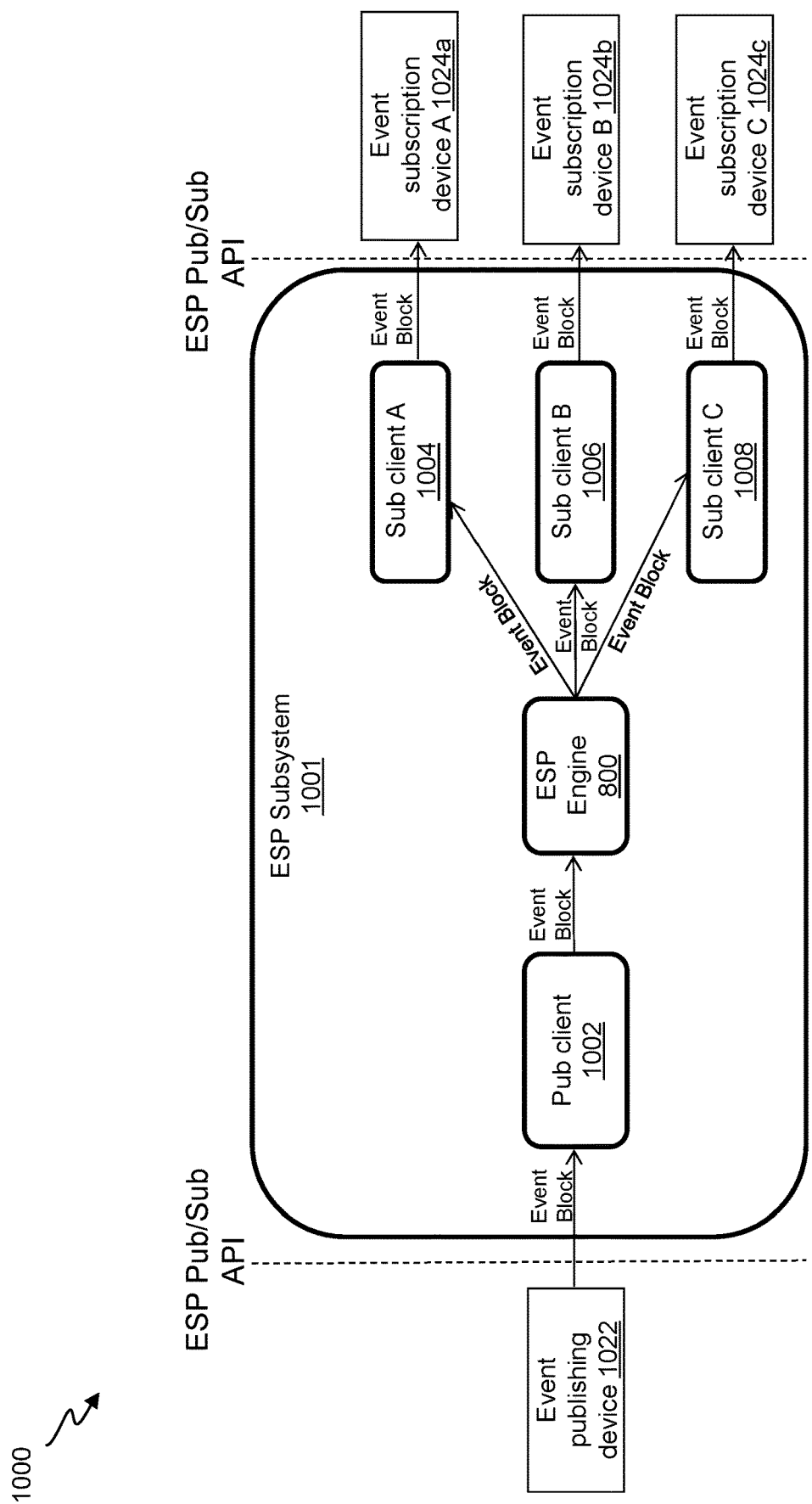
FIG. 10 illustrates an ESP system interfacing between a publishing device and multiple event subscribing devices, according to some embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may comprise one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. IoT may be implemented in various areas, such as for access (technologies that get data and move it), embed-ability (devices with embedded sensors), and services. Industries in the IoT space may automotive (connected car), manufacturing (connected factory), smart cities, energy and retail. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
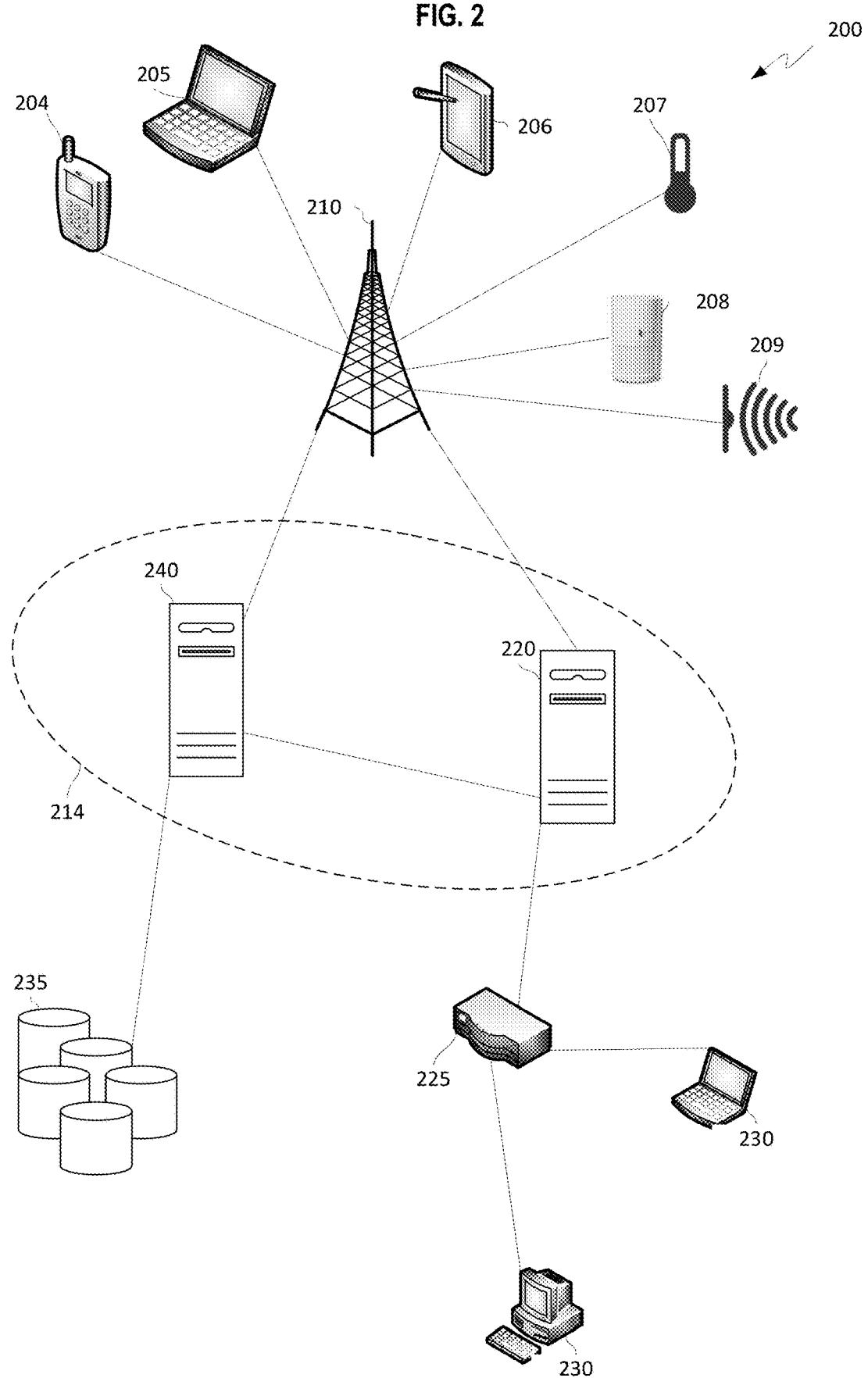
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real-time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
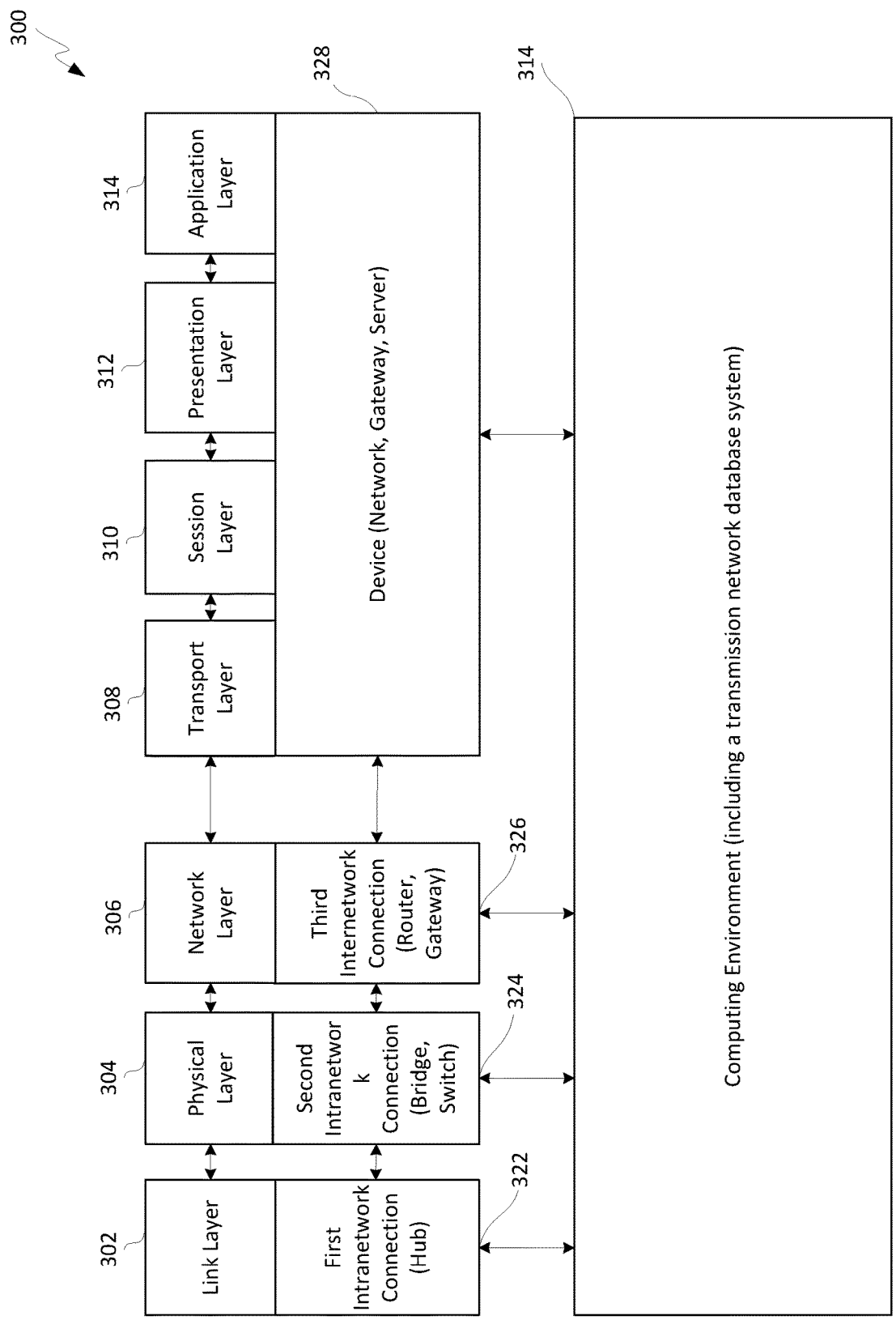
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 302. Physical layer 302 represents physical communication, and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types known to be accepted by an application or network layer.

Application layer 314 interacts directly with software applications and end users, and manages communications between them. Application layer 314 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer, and a switch can operate in the link layer. Inter-network connection components 326 and 328 are shown to operate on higher levels, such as layers 306-314. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
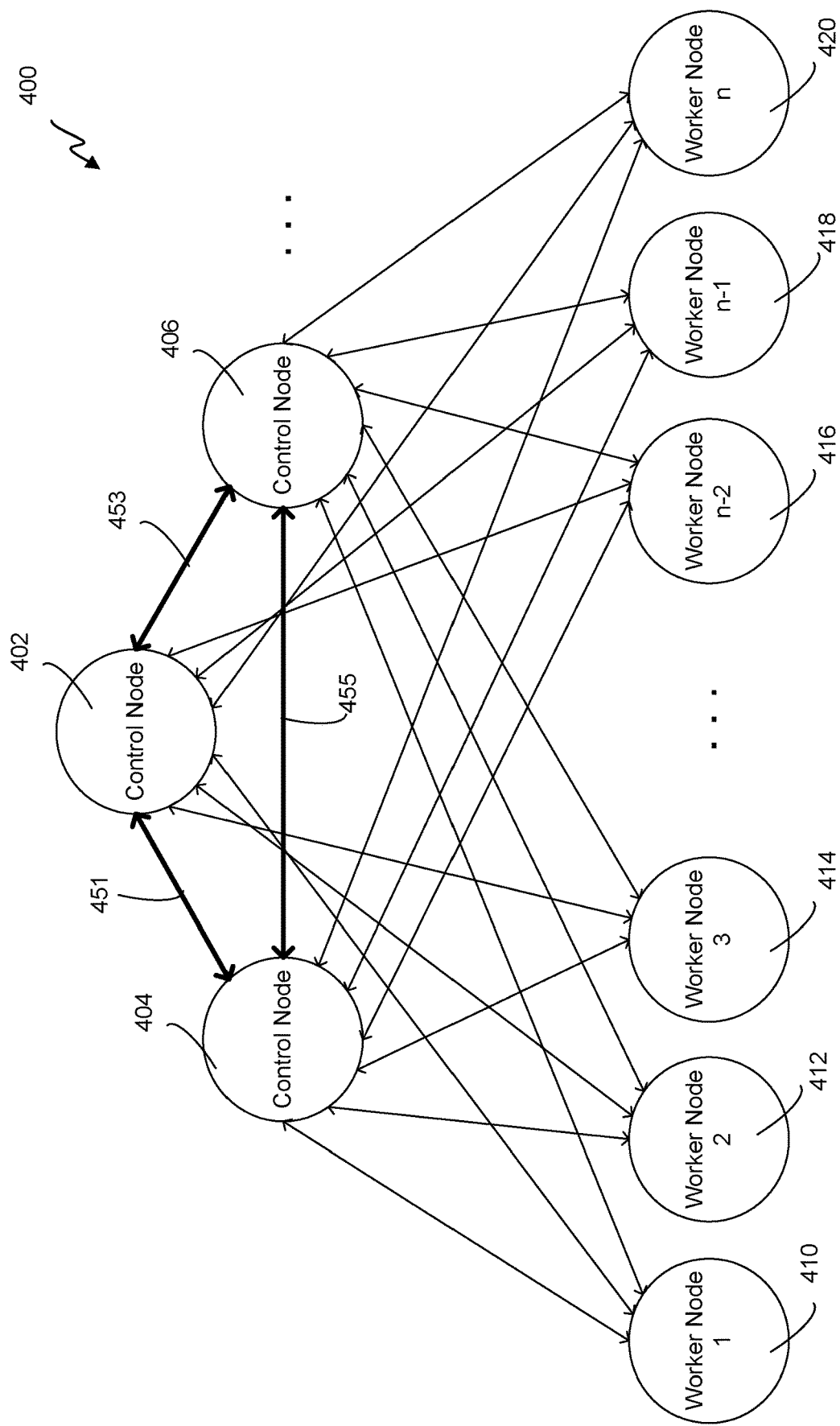
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a Hadoop data node).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes). The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
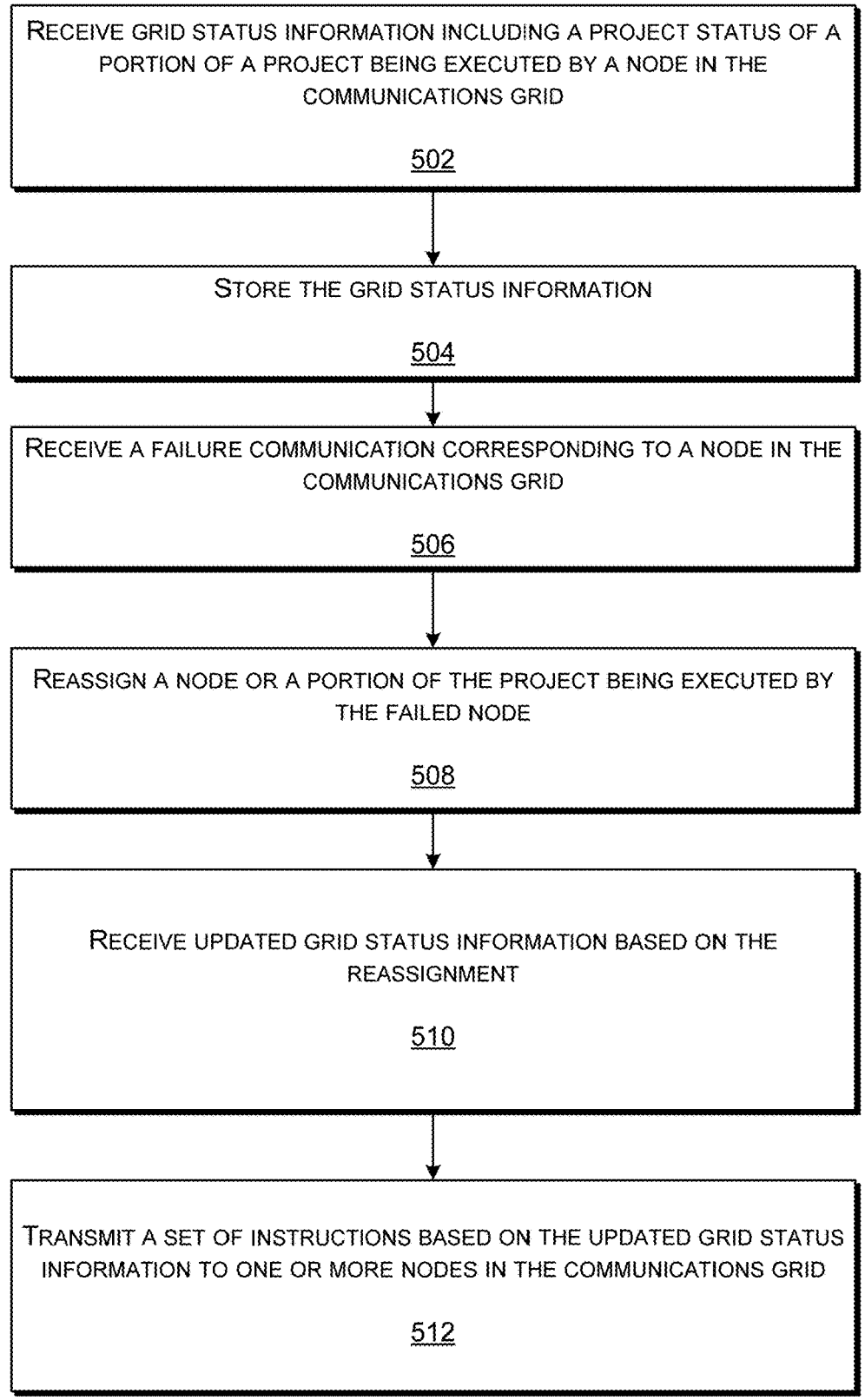
FIG. 5 illustrates a flow chart showing an example process for adjusting a communications grid or a work project in a communications grid after a failure of a node, according to some embodiments of the present technology.

FIG. 5 illustrates a flow chart showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
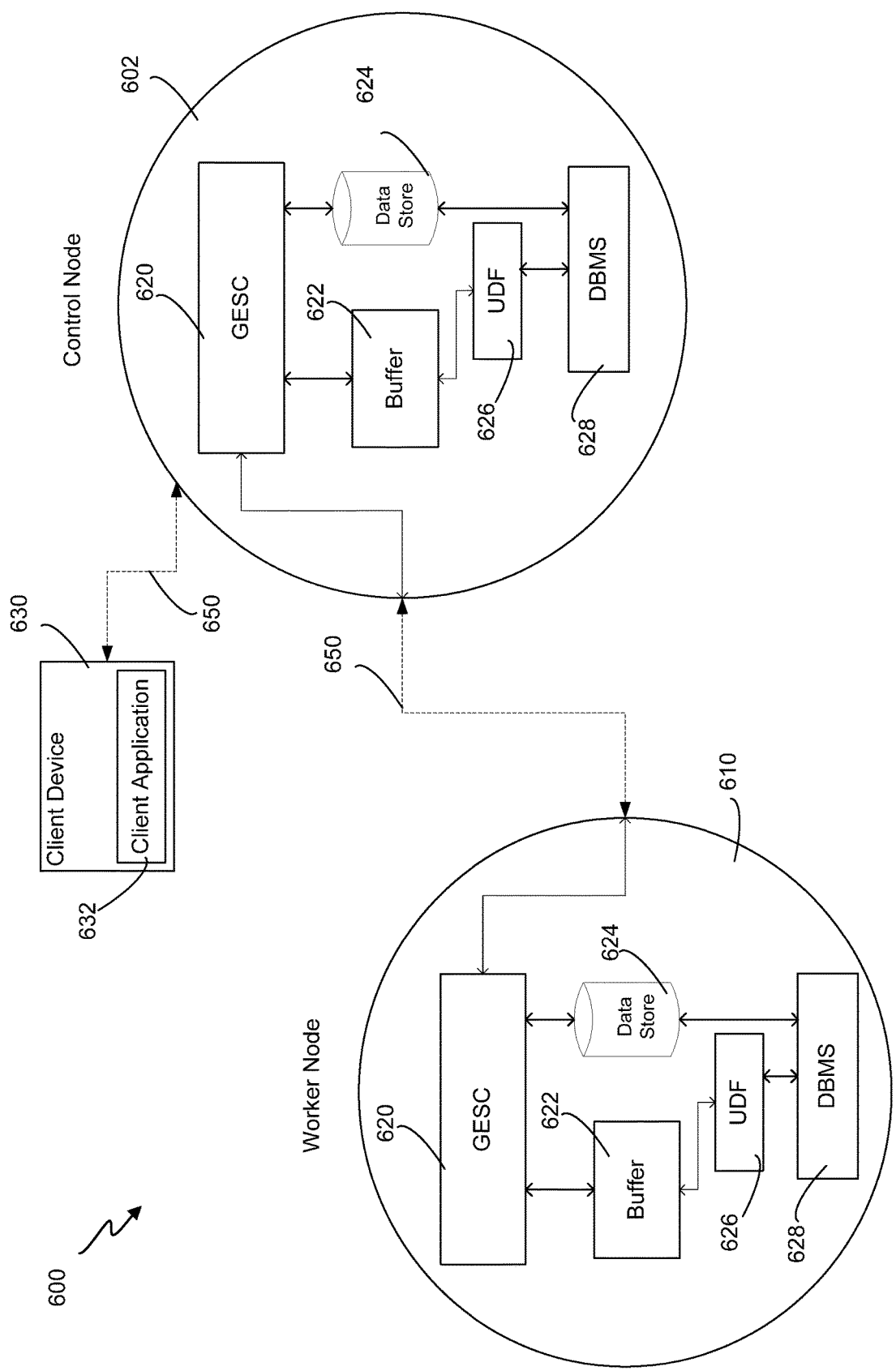
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However, in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node.

The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
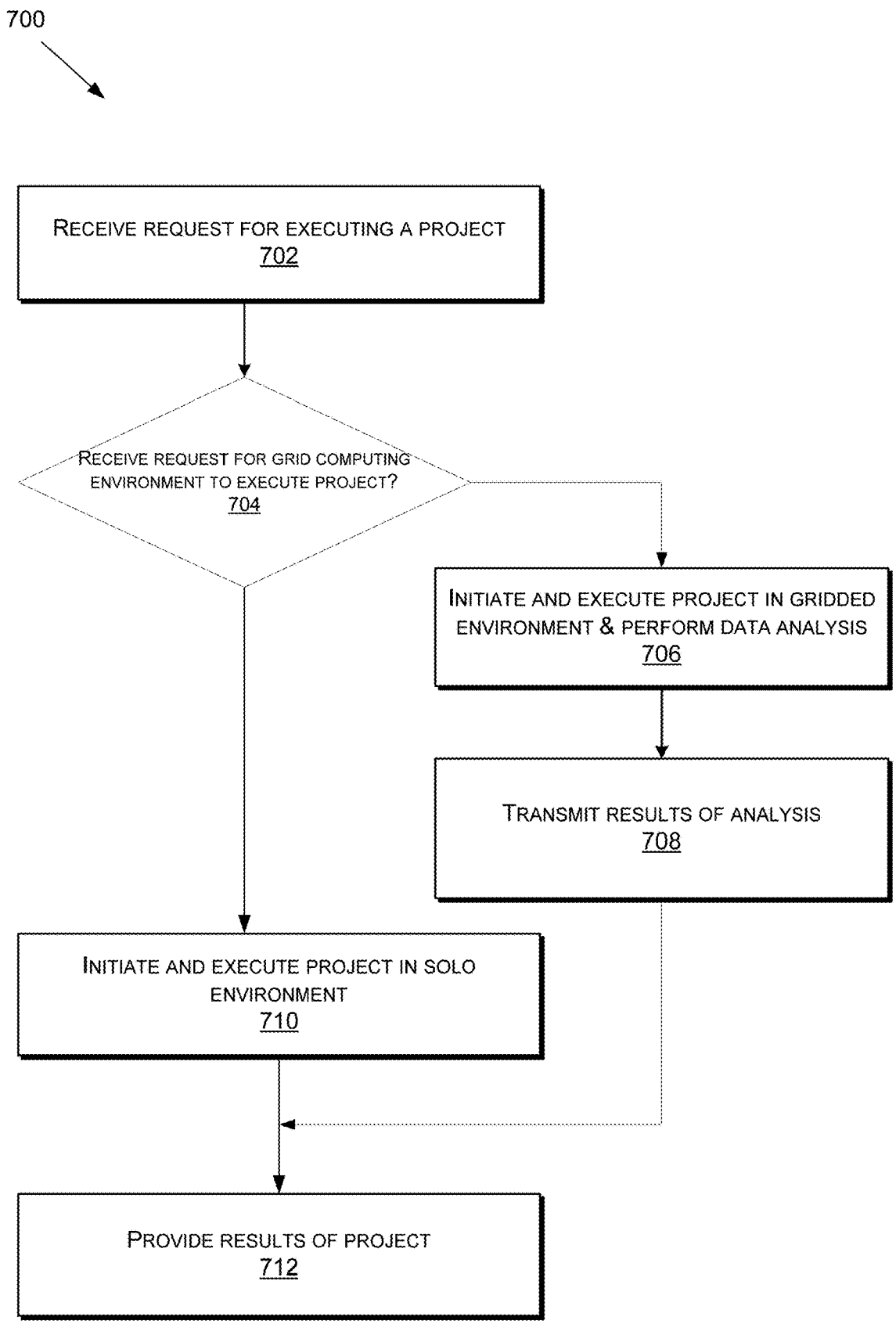
FIG. 7 illustrates a flow chart showing an example process for executing a data analysis or processing project, according to some embodiments of the present technology.

FIG. 7 illustrates a flow chart showing an example method for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024a-c, according to embodiments of the present technology. ESP system 1000 may include ESP device or subsystem 1001, event publishing device 1022, an event subscribing device A 1024a, an event subscribing device B 1024b, and an event subscribing device C 1024c. Input event streams are output to ESP device 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 806, and subscribing client C 808 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 1004, subscribing client B 1006, and subscribing client C 1008 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
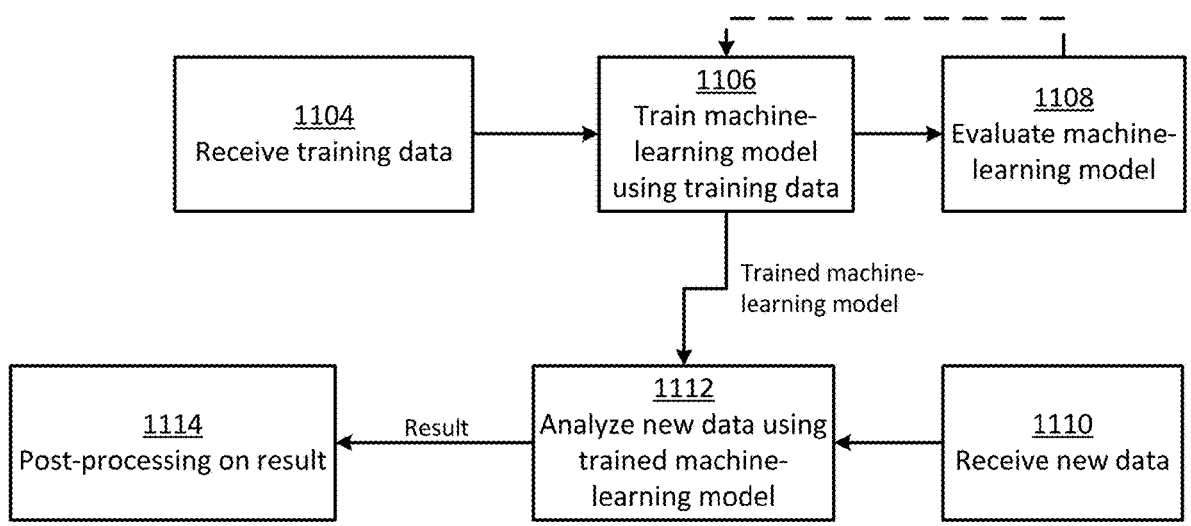
FIG. 11 illustrates a flow chart showing an example process for generating and using a machine-learning model, according to some embodiments of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
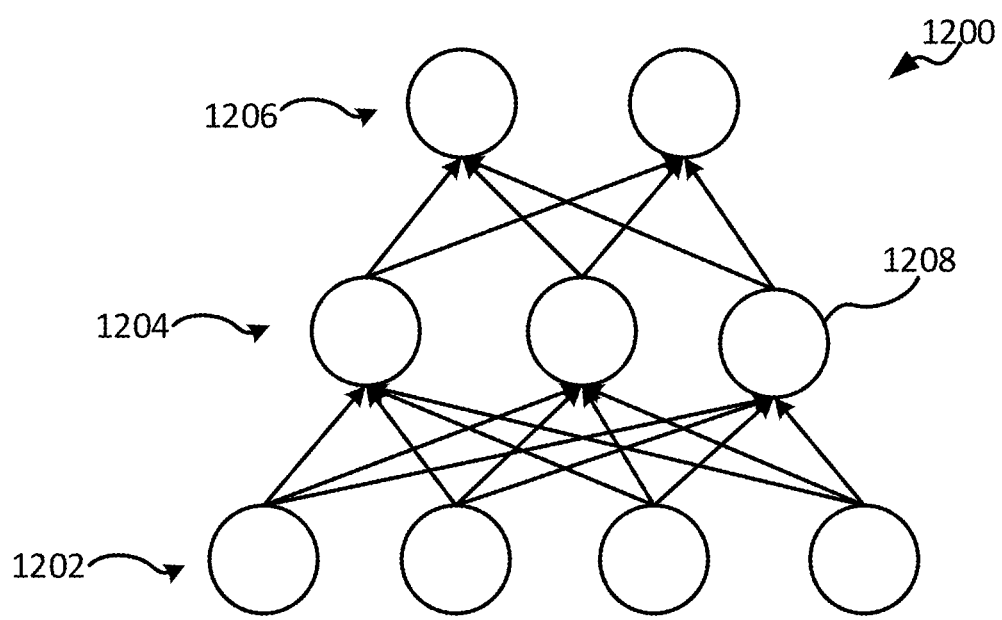
FIG. 12 illustrates an example of a machine-learning model as a neural network, according to some embodiments of the present technology.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation:

$$y = \max(x, 0)$$

where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), a complex programmable logic device (CPLD), a digital signal processor (DSP), a system on a chip (SOC), hardware accelerators (e.g., an artificial intelligence (AI) accelerator, cryptographic accelerator), a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. Furthermore, these processors may also be employed in heterogeneous computing architectures with a number of and a variety of different types of cores, engines, nodes, and/or layers to achieve various energy efficiencies, thermal processing mitigation, processing speed improvements, data communication speed improvements, and/or data efficiency targets and improvements throughout various parts of the system when compared to a homogeneous computing architecture that employs CPUs for general purpose computing. Still further, one or more of these processors may be used in applications that do not utilize machine learning.

According to embodiments discussed herein, the above-described computing devices and systems may be utilized to implement one or more components of an STS, such as a test manager, a test server, a network, a network sniffer, and/or a user interface. In many embodiments, this may facilitate reliable, accurate, and efficient testing of software. For example, the above-described computing devices and systems may be utilized to simulate a network for communication between SUT and a simulated test server. In several embodiments, the above-described computing devices and systems may facilitate one or more functionalities described herein including preventing an STS from advancing through a UI-workflow too quickly (e.g., test a result of an operation before the operation has completed) by identifying and/or waiting for predetermined network traffic to complete; preventing excessive delays to wait for necessary network requests to complete; and detecting changes to network traffic profiles driven from the Client (e.g., SUT, application server, test server, UIAT, STS). These and other features described herein may enable a computing device and/or system implementing one or more components of an STS to realize unique and advantageous functionalities, resulting in an improved computer.

Figure 13:
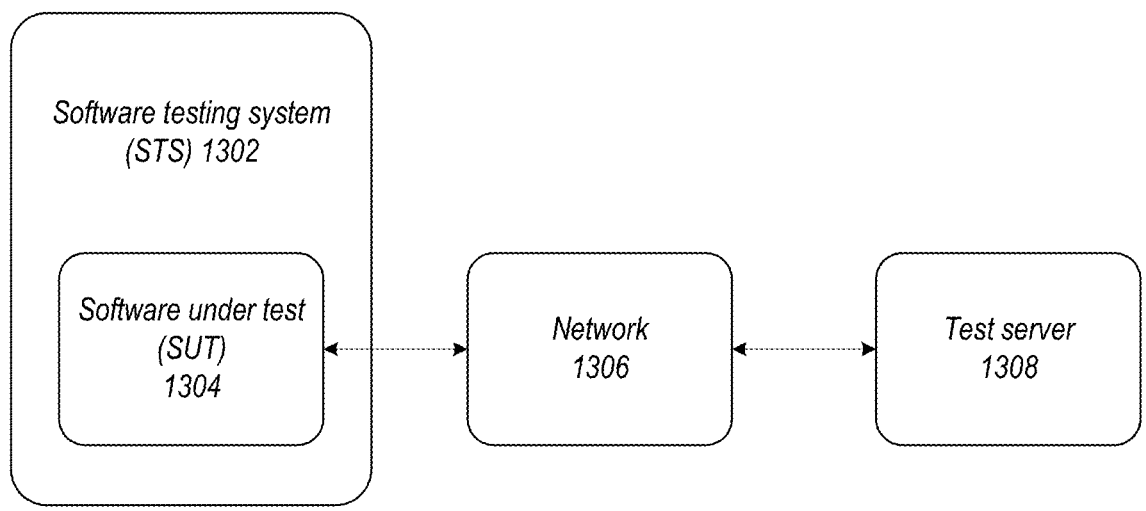
FIG. 13 illustrates an exemplary software testing system in a first operating environment, according to some embodiments of the present technology.

FIG. 13 illustrates a software testing system (STS) 1302 in operating environment 1300, which may be representative of various embodiments. Operating environment 1300 includes STS 1302, network 1306, and test server 1308. STS 1302 may include software under test (SUT) 1304 and SUT 1304 may be in communication with a test server 1308 via network 1306. In many embodiments, STS 1302 may utilize sniffed network communication data to verify and/or validate request and/or response data associated with performance of an operation by the SUT 1304. In many embodiments described herein, STS 1302 records and/or monitors network traffic between SUT 1304 and test server 1308 via network 1306. In many such embodiments, the detection of specific network traffic may be utilized to determine when an operation has completed. In some embodiments, one or more components illustrated in FIG. 13 may be the same or similar to one or more other components described herein. Embodiments are not limited in this context.

Many embodiments are generally directed to techniques for improved automated software testing, such as by verifying operations are complete based on user interface and/or network traffic indications. Multiple embodiments may utilize a network sniffer to detect specific network traffic to verify completion of network requests and/or responses associated with an operation included in a workflow for performance by SUT 1304. The SUT 1304 may comprise one or more types of software applications and/or software components, such as a user interface application or an operating system (OS) application that utilizes a network interface with a test server). In many embodiments, the detection of specific network traffic may be used to accurately time operation durations and/or efficiently perform workflows to evaluate the SUT. In some embodiments, one or more portions of SUT 1304 may be implemented by the test server 1308. For example, the SUT 1304 may include an application hosted by the test server 1308 and/or an interface for interacting with the application, such as via network 1306. In some such examples, the interface for interacting with the application may be via a network access application (e.g., a web browser) implemented by a client.

Figure 14:
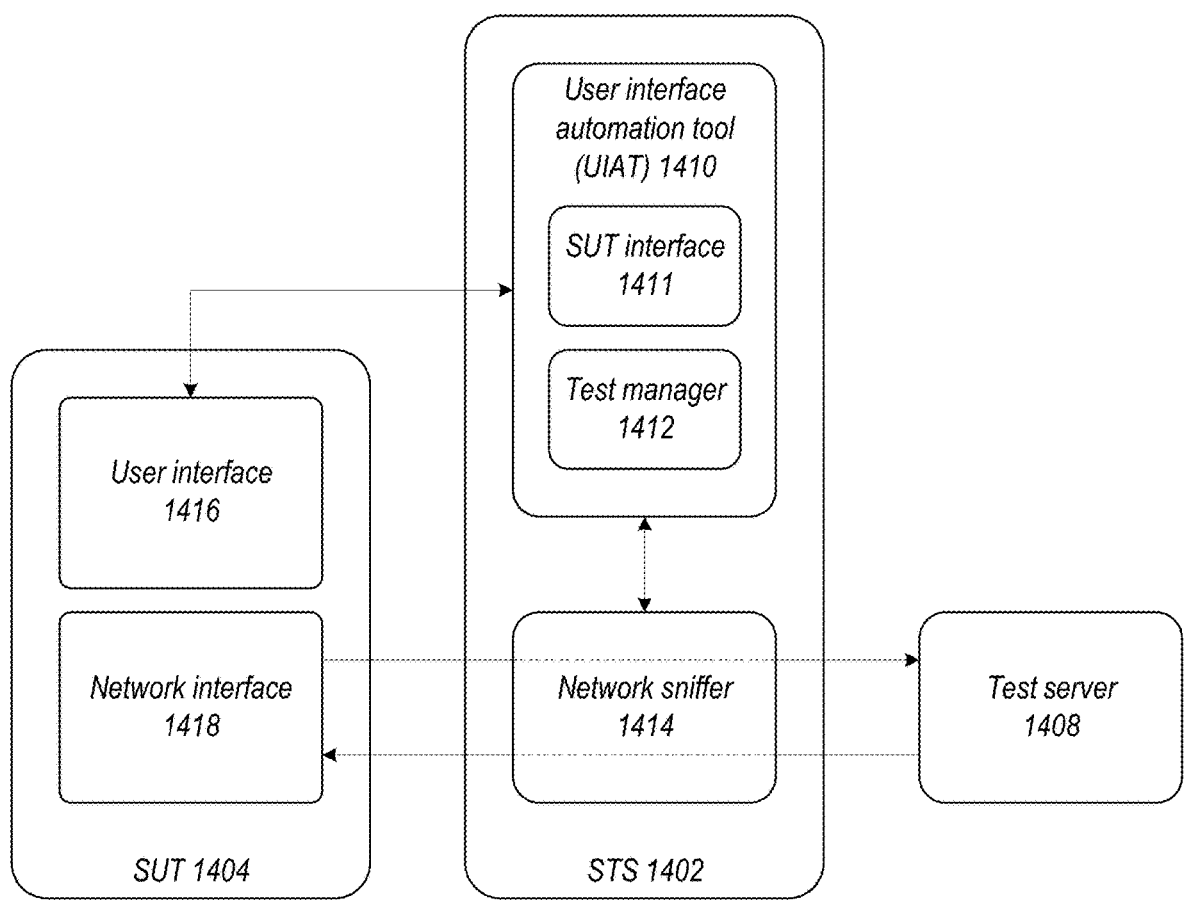
FIG. 14 illustrates an exemplary software testing system in a second operating environment, according to some embodiments of the present technology.

FIG. 14 illustrates a software testing system (STS) 1402 in operating environment 1400, which may be representative of various embodiments. Operating environment 1400 may include STS 1402, SUT 1404, and test server 1408. SUT 1404 may include user interface 1416 and network interface 1418. STS 1402 may include network sniffer 1414 and user interface automation tool (UIAT) 1410 with SUT interface 1411 and test manager 1412. In some embodiments, one or more components illustrated in FIG. 14 may be the same or similar to one or more other components described herein. For instance, SUT 1404 may be the same or similar to SUT 1304. In many embodiments, SUT interface 1411 of UIAT 1410 may interact with SUT 1404, such as via user interface 1416, to initiate operations. In several embodiments, operations carried out by SUT 1404 may utilize network interface 1418 to communicate with test server 1408. In several such embodiments, network sniffer 1414 may record network traffic between SUT 1404 and test server 1408 and/or monitor the network traffic, in real time, for specific network traffic associated with completion of an operation (e.g., network request and/or response data). Embodiments are not limited in this context.

In one or more embodiments, STS 1402 may utilize network sniffer 1414 to determine operations of a SUT 1404, such as those initiated by UIAT 1410, have completed. In many embodiments, the use of network sniffer 1414 with UIAT 1410 may be integrated into the workflow in real time (or near-real time), such as via test manager 1412. These and other features may allow the STS 1402 to precisely record timings and avoid adding fixed delays for the workflow to consistently function. For example, sniffing of network traffic in real time for specific network traffic associated with completion of an operation by the SUT can be used to determine when the operation is finished/completed regardless of whether there is an indication of the operation's completion provided/detected via user interface 1416. In many embodiments, accurate and real-time determination of completion times allows precise and reliable timing of operations and/or quick and consistent execution of a workflow to test software. It will be appreciated that although SUT 1404, STS 1402, and test server 1408 are illustrated as separate components, they may be included in one or more of the same and/or different components without departing from the scope of this disclosure. In some embodiments, each of the components may be implemented by a single machine, or a local group of machines. In such embodiments, testing can be simplified by not requiring/using multiple distinct machines to perform testing.

In various embodiments, SUT interface 1411 of UIAT may interact with the SUT 1404 via one or more interfaces, such as to initiate operations. In the illustrated embodiment, the SUT interface 1411 of UIAT 1410 interacts with the user interface 1416 to initiate an operation. Additionally, or alternatively, in some embodiments, the SUT interface 1411 may initiate an operation via an application programming interface (API). Once an operation has been initiated, the STS 1402 may detect an accurate end of the operation. For example, network sniffer 1414, integrated with the UIAT 1410 via test manager 1412, may look for specific network traffic. The test manager 1412 may wait for the UI to complete, accurately record that the operation is completed, and continue with the next step of the workflow. In many embodiments, the test manager 1412 may attempt to verify the response data. If incorrect data is detected, the workflow may be redirected to an error path and if the correct data is detected, the workflow may be continued. In various embodiments, an error path may include one or more operations performed in response to detection of an error and/or incorrect data. For example, an error path may include recording extra debug information regarding the issue, such as to help identify the cause of the issue. In some such examples, the extra debug information may include a video of the event. In addition, or alternative, to collecting more details about the error, the error path may be an alternative workflow due to the error being detected. For instance, the alternative workflow may include logging a user off and/or not adding an item to a shopping cart.

In several embodiments, network traffic may be recorded and/or monitored. For instance, network traffic, or characteristics thereof, may be stored in one or more computer-readable media (e.g., one or more of main memory, disk memory, flash memory, caches, registers, system memory, random access memory), such as by network sniffer 1414, UIAT 1410, test server 1408, and/or test manager 1412. In many such instances, the one or more computer-readable media may be collectively referred to as a test digest. In various embodiments, captured network traffic (e.g., traffic stored in the test digest) may be used to validate the accuracy of sent and received data in real-time. In one or more embodiments, the process of integrating sniffed network traffic with UI automation tools can significantly improve one or more of flow control, timing, and validation.

More generally, accurate timings (e.g., how long an operation takes to complete) may be important for software performance testing and engineering. Quick and consistent flow control can be crucial when automating software testing. In various embodiments, flow control may refer to the steps that the UIAT 1410 uses to perform the desired operations against the SUT 1404 (e.g., application under test). Several embodiments may additionally, or alternatively, verify and/or validate request and/or response data. For example, request data may be sent from SUT 1404 to test server 1408 and/or response data may be sent from test server 1408 to network interface 1418. In some embodiments, UIAT 1410 and/or SUT interface 1411 may be a UI automation tool for driving browsers or windows applications (e.g., C# based Ranorex®). Additionally, or alternatively, in various embodiments, network sniffer 1414 may comprise a browser-based network traffic sniffing tool with an API used to interface with network requests (e.g., Http-Watch® with a C# API). Accordingly, in various embodiments, UIAT 1410 and/or test manager 1412 may interact with network sniffer 1414 via an API.

Figure 15:
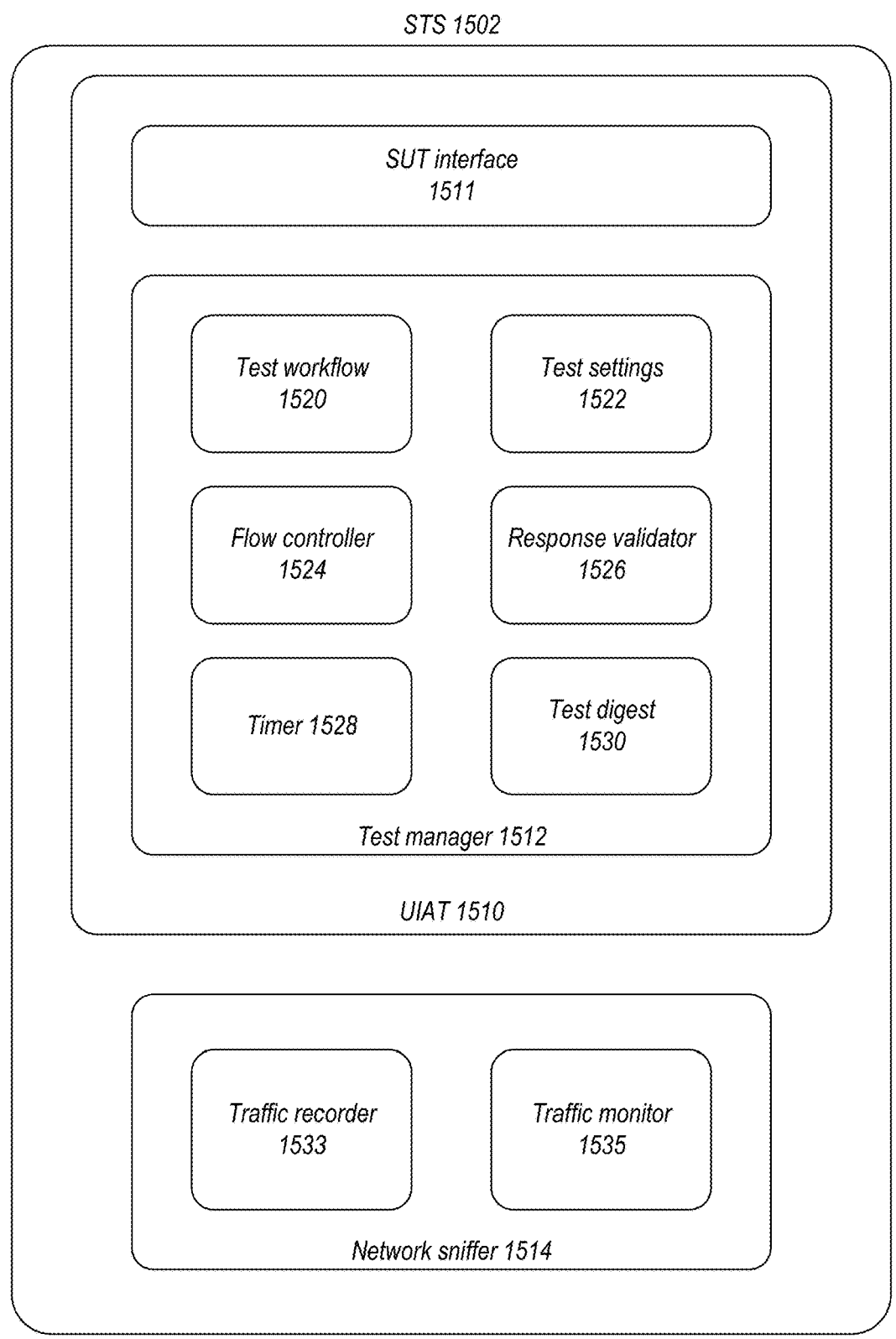
FIG. 15 illustrates exemplary components of a software testing system, according to some embodiments of the present technology.

FIG. 15 illustrates exemplary components of an STS 1502 in operating environment 1500, which may be representative of various embodiments. Operating environment 1500 may include STS 1502 with network sniffer 1514 and UIAT 1510 having SUT interface 1511 and test manager 1512. Test manager 1512 may include test workflow 1520, test settings 1522, flow controller 1524, response validator 1526, timer 1528, and test digest 1530. Network sniffer 1514 may include traffic recorder 1533 and traffic monitor 1535. In many embodiments, the components of STS 1502 may interoperate to test software according to the test workflow 1520 and test settings 1522. In many such embodiments, test manager 1512 may operate SUT interface 1511 and/or network sniffer 1514 to implement the test workflow 1520 and test settings 1522. For example, test manager 1512 may cause SUT interface 1511 of UIAT 1510 to initiate an operation via a user interface of the software under test. In such examples, test manager 1512 may then utilize network sniffer 1514 to detect specific network traffic indicating the operation has completed. Embodiments are not limited in this context.

In some embodiments, one or more components illustrated in FIG. 15 may be the same or similar to one or more other components described herein. For instance, STS 1502 may be the same or similar to STS 1402. The components of the embodiment illustrated in FIG. 15 are exemplary and additional, and/or alternative, components may be utilized without departing from the scope of this disclosure. For example, network sniffer 1514 may be located external to STS 1502. In another example, test manager 1512 may be separate from the UIAT 1510. In one or more embodiments, network sniffer 1514 may be accessed by test manager 1512 via an API.

The SUT interface 1511 of UIAT 1510 may be used to interact with a client UI (e.g. a graphical user interface of the software under test) that sends requests to a test server (e.g., application server). In some embodiments, the SUT interface 1511 may interact with SUT via an API. The network sniffer 1514 may be used to determine when to progress through the test workflow 1520 (e.g., by identifying completion of an operation), based on criteria such as data transmission and data validation. In various embodiments, the criteria may be included in the test workflow 1520 and/or the test settings 1522. In many embodiments, the criteria may be customizable and/or includes one or more wildcard characters. More generally, the test workflow 1520 may include one or more operations associated with evaluation of a SUT by STS 1502 and the test settings 1522 may include one or more conditions and/or configurations for execution of the test workflow 1520 and/or controlling one or more operational aspects of the STS 1502. For example, test settings 1522 may indicate how often test manager 1512 should poll the network sniffer 1514. In another example, test settings 1522 may indicate how SUT interface 1511 should interact with the SUT (e.g., via a GUI or via an API).

Flow controller 1524 may be utilized to advance through the test workflow 1520 or redirect to an error path. For example, flow controller 1524 may advance to a next step of the test workflow 1520 or redirect from the test workflow 1520 to an error path based on network communications identified by network sniffer 1514 (e.g., traffic monitor 1535) and analyzed by response validator 1526. In many embodiments, response validator 1526 may interoperate with network sniffer 1514 (e.g., traffic monitor 1535) to perform live verification and error detection. In many such embodiments, the results of the live verification and error detection may be utilized by flow controller 1524 to determine whether to advance to a next step of the test workflow 1520 or redirect to an error path from the test workflow 1520. For example, test manager 1512 may utilize network sniffer 1514 to determine whether a network response includes the predetermined string "7305.0". In such examples, if the string is not detected in the network response an error is detected and implementation of the test workflow 1520 is stopped and an error path is implemented. In another example, error detection may include detecting an HTTP status code for a client error or server error. In yet another example, error detection may include monitoring UI behavior for abnormalities, such as glitches, erroneous indications, and the like. In such other examples, the UI may be monitored to detect abnormalities in response to entering an error path based on network traffic detected (or not detected).

In one or more embodiments, test workflow 1520 may be adjusted to handle an error. In some embodiments, the workflow may be adjusted by skipping to the next method and not continuing down a path that is guaranteed to fail, which can reduce time and/or improve efficiency. For example, when an early step of creating a GUI chart fails, it is inefficient to continue creating that chart. Instead, a jump to trying the next chart may be performed (this failure may be detected by network traffic and not the UI, such as in instances that the chart is not supposed to render at all at this point). In various embodiments, the workflow may be adjusted by reattempting an operation that failed, which can save the rest of a run. The failed operation may still be logged, tracked, and/or marked as a failure. For example, when interacting with an 'OK' button (e.g., via clicking or selecting), the button may not be properly actuated, and the operation may not have taken place. Embodiments described herein may automatically retry interacting with the 'OK' button. In some such embodiments, failure to properly interact with the 'OK' button may be automatically determined based on network traffic (i.e., no user intervention required). In one or more embodiments, the workflow may be exited early, which may prevent the system from being left in a bad state (e.g., from continuing to perform steps) and/or save time by avoiding unnecessary execution of steps. In some embodiments, the unnecessary execution of steps in subsequent iterations to recover the system from a bad/unintended state may be avoided based on network traffic. For example, a failing run may be detected based on network traffic prior to the failing run leaving a system in an undesired state such as by adjusting settings based on old data that was not properly updated due to a failure to request or receive the updated data over a network.

The timer 1528 may be utilized to track and record timing for various operations performed as part of execution of the test workflow 1520. In some embodiments, the network sniffer 1514 may include the timer 1528 and/or an additional timer. These and other features may allow the STS 1502 to reliably function while precisely recording timings. For example, sniffing of network traffic in real time for specific network traffic associated with completion of an operation by the SUT can be used to determine when the operation is finished/completed regardless of whether there is an indication of the operation's completion provided/detected via a user interface. In many embodiments, accurate and real-time determination of completion times allows exact and reliable timing of operations and/or quick, unimpeded, and consistent execution of test workflow 1520.

In several embodiments, network traffic may be recorded/captured (e.g., via traffic recorder 1533 and/or monitored (e.g., via traffic monitor 1535). For instance, network traffic, and/or characteristics thereof, may be stored in one or more computer-readable media (e.g., one or more of main memory, disk memory, flash memory, caches, registers, system memory, random access memory), such as by traffic recorder 1533 and/or traffic monitor 1535. In some such instances, the network traffic, and/or characteristics thereof, may be stored in the test digest 1530. In some embodiments, the captured network traffic (e.g., traffic stored in the test digest 1530) may be used to validate the accuracy of sent and received data. In several embodiments, traffic recorder 1533 may listen and store network traffic while traffic monitor 1535 may analyze and/or take action on network traffic in real time. In other words, traffic recorder 1533 may listen and record, in real time, streaming network traffic and traffic monitor 1535 may interpret and/or act on, in real time, the network traffic and/or characteristics thereof (e.g., quantity and/or quality of traffic). For example, traffic recorder 1533 may store a history of network traffic in the test digest 1530 and traffic monitor 1535 may be used to identify specific network traffic (i.e., network completion data), in real time, to enable completion of an operation initiated by UIAT 1510 to be verified by response validator 1526. In another example, five HTTP requests that went to a uniform resource locator (URL), such as /reportData/jobs, may be listened for and/or five responses to the five requests that include the string "completed" may be listened for. In such other example, the absence of one or more of the requests and/or responses may result in error detection and/or initiating an error path.

In various embodiments, data collected and/or generated by one or more components of STS 1502 may be stored in one or more computer-readable media (e.g., one or more of main memory, disk memory, flash memory, caches, registers, system memory, random access memory) in one or more devices. In various such embodiments, the one or more computer-readable media, or data stored therein, may be collectively referred to as the test digest 1530. Accordingly, in several embodiments, test digest 1530 may comprise, or refer to, one or more portions of distinct and/or disparate data associated with implementation of test workflow 1520 by STS 1502.

FIGS. 16A-16G illustrate various aspects of an exemplary workflow performed by a software testing system, which may be representative of various embodiments. FIGS. 16A-16G may include environments 1600A, 1600B, 1600C, 1600D, 1600E, 1600F, 1600G, respectively. The environments 1600A-1600G may include exemplary illustrations of interfaces and/or feedback provided via the interfaces during implementation of a workflow. In the following description, environments 1600A-1600F of FIGS. 16A-16F occur sequentially. Embodiments are not limited in this context.

Figure 16A:
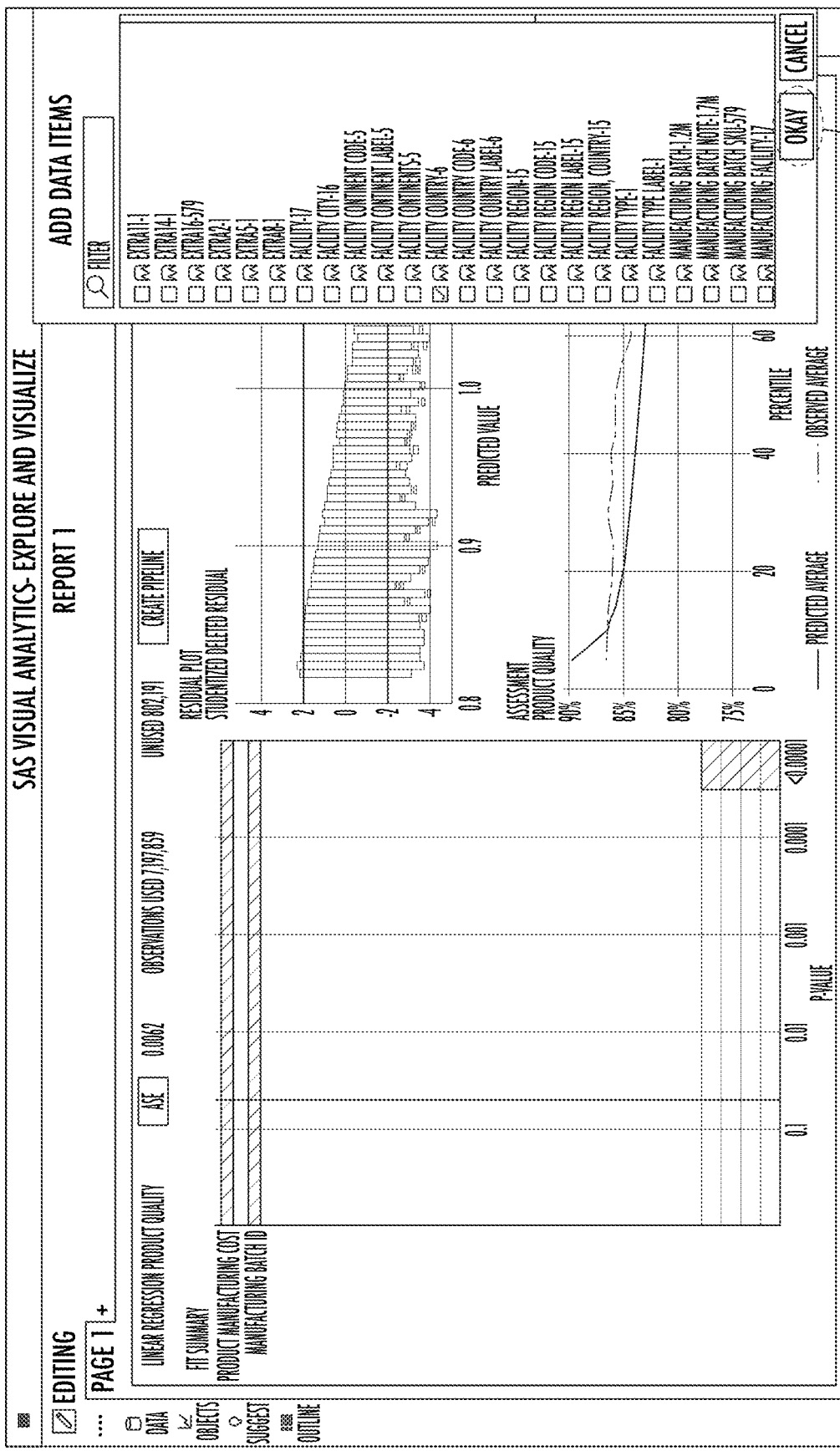
FIGS. 16A-16G illustrate various aspects of an exemplary workflow performed by a software testing system, according to some embodiments of the present technology.

Referring to FIG. 16A, environment 1600A may include a user interface 1616 with interface element 1632. The user interface 1616 may illustrate a graphical user interface (GUI) utilized to interact with the SUT. In some embodiments, the user interface 1616 may be provided and/or accessed by a client application, such as a web browser. For instance, the user interface 1616 may be accessed by going to a specific network address (e.g., website) with a web browser. In many embodiments, the user interface 1616 may be interacted with via a UIAT of an STS. In many such embodiments, input may be provided by the UIAT to select the interface element 1632 to initiate an operation on the SUT during implementation of a workflow by the STS.

Figure 16B:
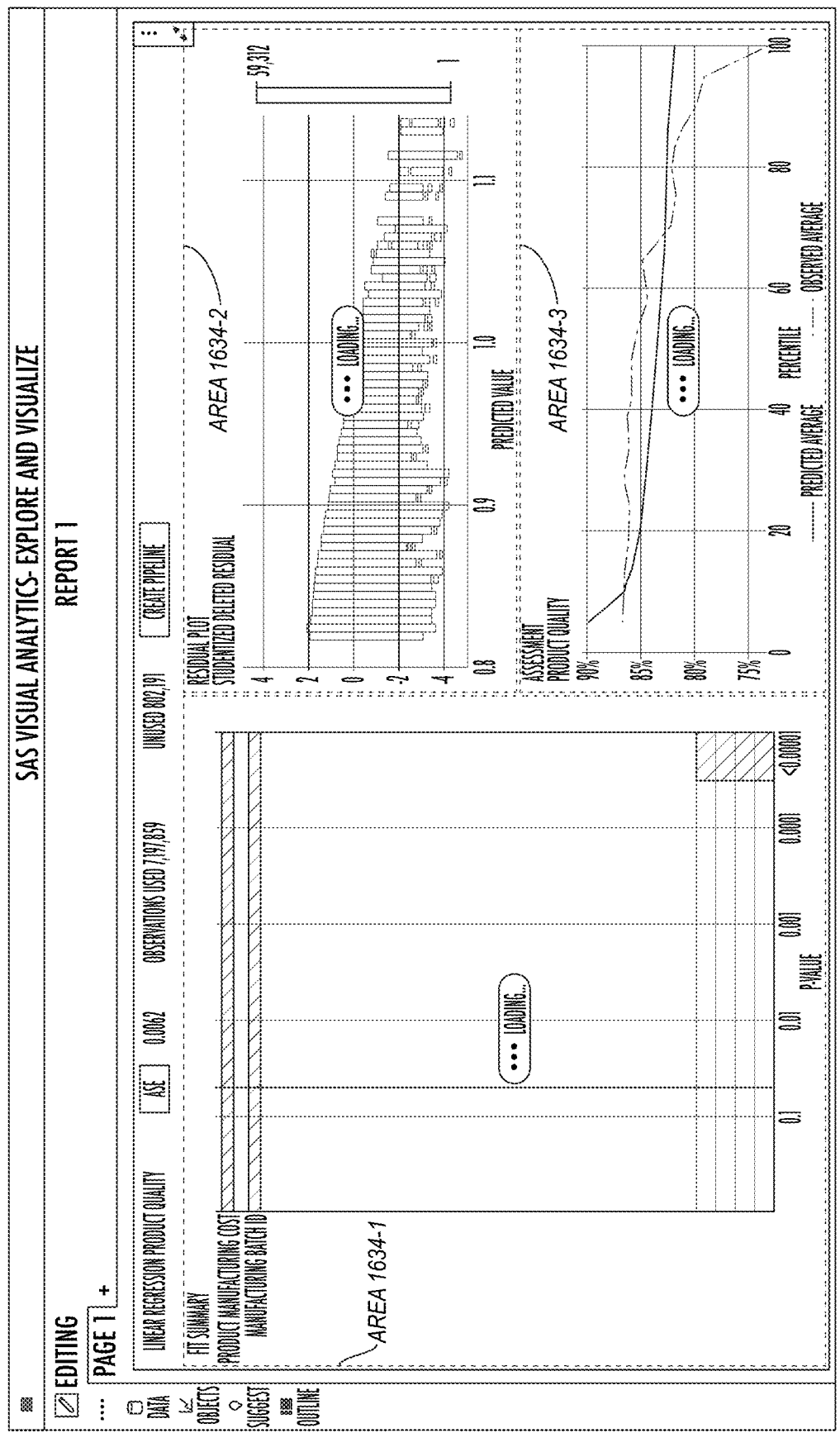

Referring to FIG. 16B, environment 1600B may include the user interface 1616 with areas 1634-1, 1634-2, 1634-3 (or areas 1634). In the illustrated embodiment of environment 1600B, the areas 1634 may each include a progress indicator (e.g., loading bar, loading indicator, and the like). The progress indicators may indicate that data is being acquired for these areas as a result of initiating the operation via interface element 1632 in environment 1600A. In several embodiments, data is acquired for each area by requesting the data via one or more network requests and receiving the data via one or more network responses. In several such embodiments, the network request/response is sent/received to/from an application executing on a test server. In various embodiments, the network requests/responses may comprise HTTP messages. In various such embodiments, the HTTP messages may comprise one or more network packets. In some embodiments, a network request/response pair may correspond to each of the three areas 1634. In the descriptions of FIGS. 16C-16G, a network request/response pair for each of the three areas 1634 may be assumed unless otherwise stated.

Figure 16C:
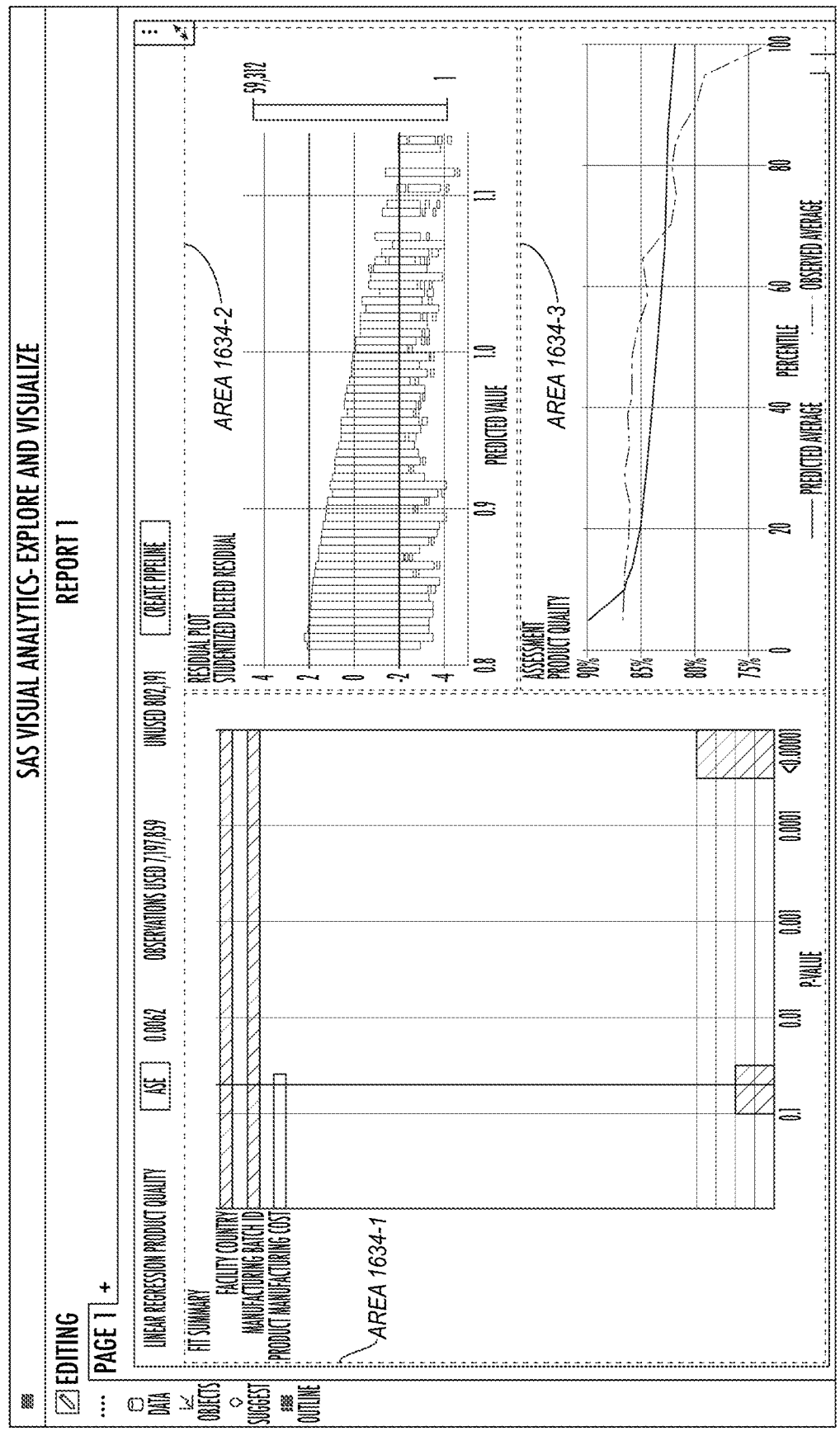
Figure 16D:
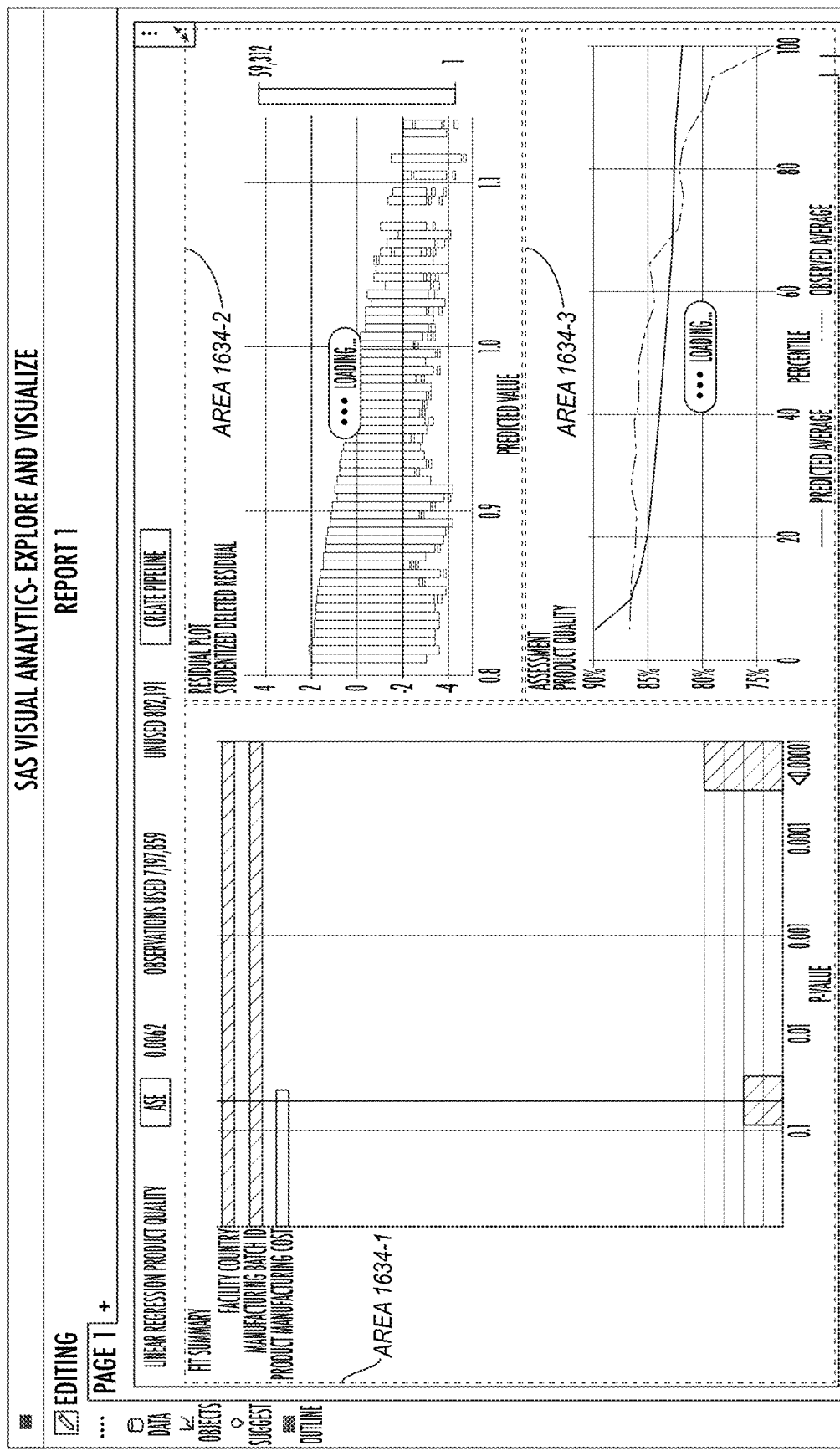

Referring to FIG. 16C, environment 1600C may include the user interface 1616 with areas 1634. In the illustrated embodiment of environment 1600C, the progress indicators in each of the areas 1634 have disappeared, however, only the data of area 1634-1 has been updated. Referring to FIG. 16D, environment 1600D may include the user interface 1616 with areas 1634. In the illustrated embodiment of environment 1600D, the progress indicators in areas 1634-2, 1634-3 have returned to indicate those areas have not actually been updated. In operation, the illustrated embodiment of 1600C may occur relatively quickly (e.g., under a second). However, this may be more than enough time for a UIAT to erroneously detect completion of the operations. This illustrates at least one difficulty in relying on user interface indications to determine when an operation has completed. In other embodiments, user interface indications may appear and disappear before they can be detected with a UIAT, or there may be no user interface indication.

Figure 16E:
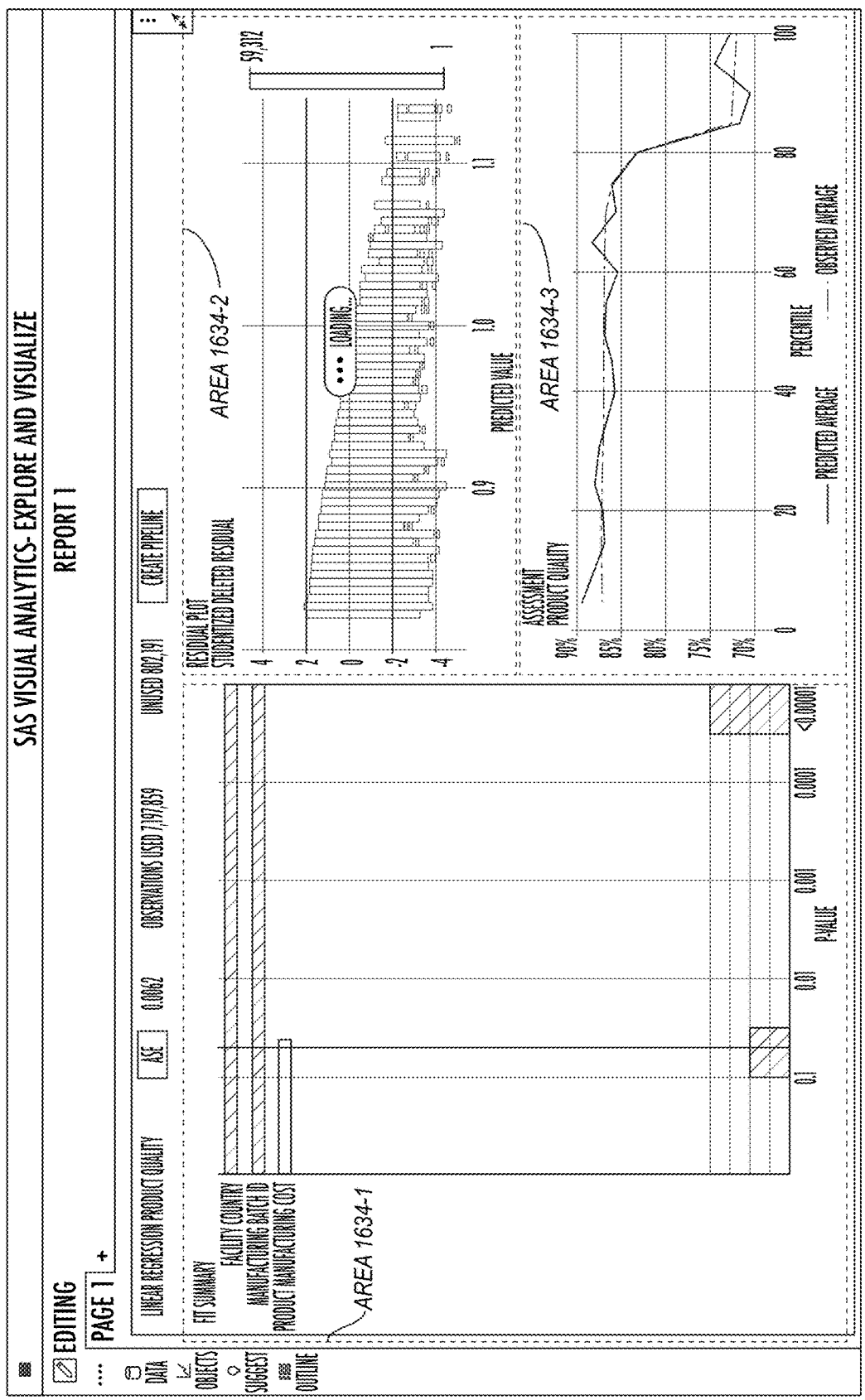
Figure 16F:
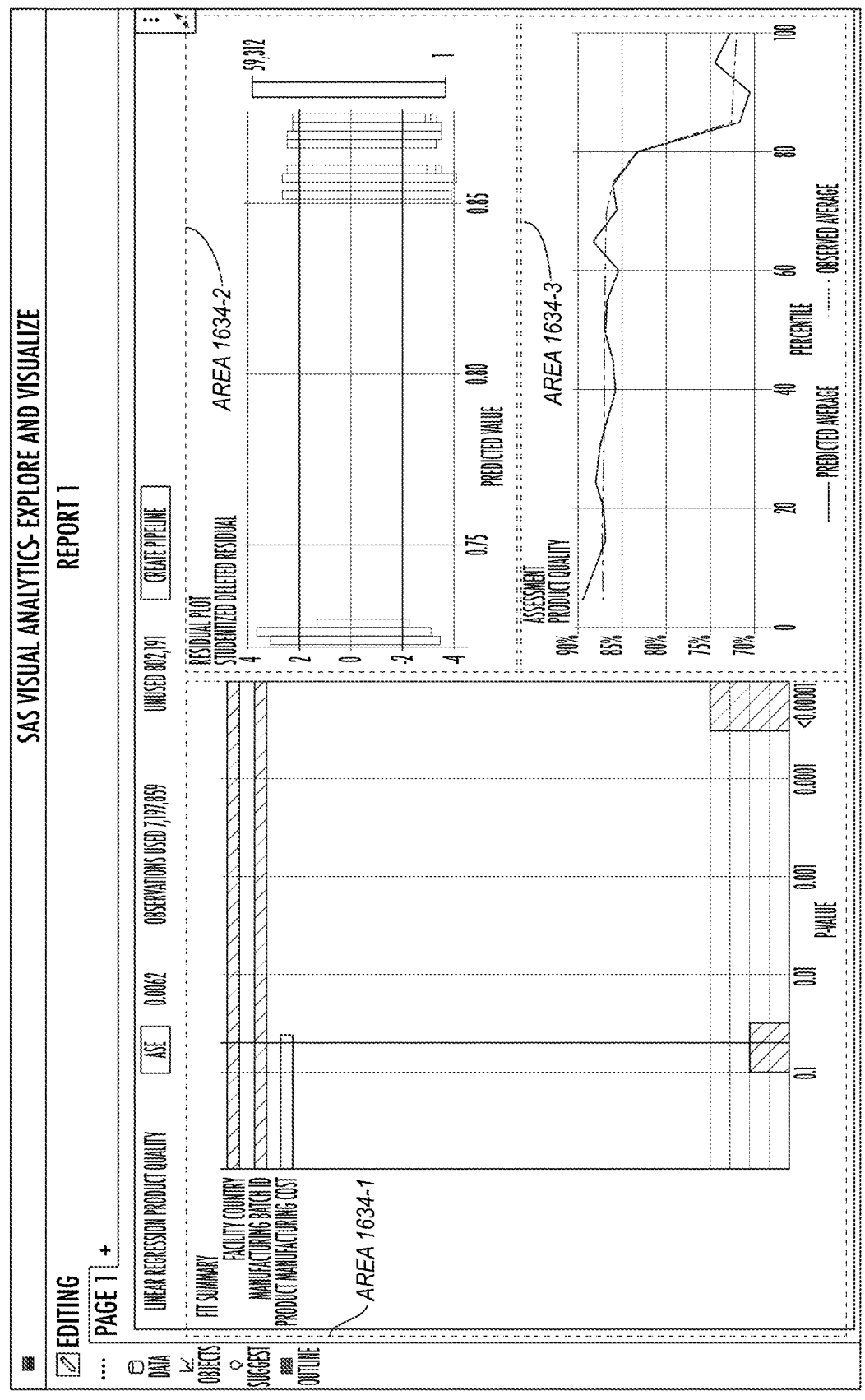

Referring to FIG. 16E, environment 1600E may include the user interface 1616 with areas 1634. In the illustrated embodiment of environment 1600E, the progress indicator in area 1634-3 has disappeared to indicate the data of area 1634-3 has been updated, while the progress indicator in area 1634-2 remains to indicate the data of area 1634-2 has not been updated. Referring to FIG. 16F, environment 1600F may include the user interface 1616 with areas 1634. In the illustrated embodiment of environment 1600F, the progress indicator in area 1634-2 has disappeared to indicate the data of area 1634-2 has been updated. Accordingly, in environment 1600F, all progress indicators have disappeared and the data in all three areas 1634 has been updated, which may indicate completion of the operation. However, a UIAT advancing in a test workflow when all progress indicators disappeared in environment 1600C without the data in all three areas 1634 having been updated as shown in environment 1600F may result in faulty test results and/or a failed test. For example, a completion time recorded for the operation may be significantly less than the actual completion time. In another example, attempting to initiate a subsequent operation prior to the operation completing may cause an error in the SUT.

Figure 16G:
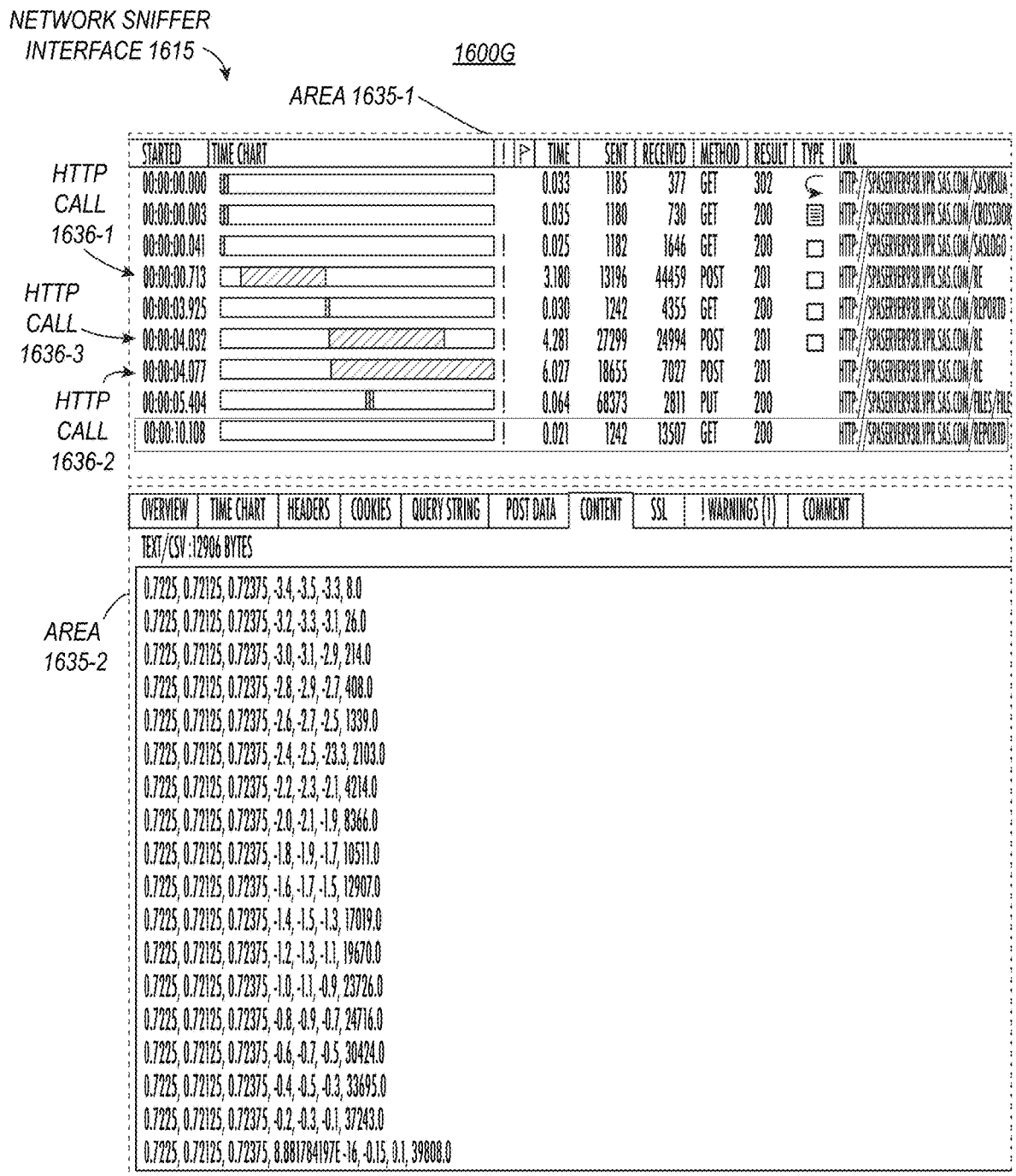

Accordingly, referring to FIG. 16G, one or more embodiments described herein may utilize a network sniffer to identify specific network traffic to determine when an operation has completed and prevent erroneous completion detection. In some embodiments, a completion determination may be made based on user interface indications and network traffic indications. In some such embodiments, the user interface indications and the network traffic indications may be compared to identify erroneous completion indications. The illustrated embodiment of environment 1600G includes a network sniffer interface 1615 with areas 1635-1, 1635-2 (or areas 1635). The area 1635-1 may show network traffic along with various metadata regarding each HTTP call (e.g., HTTP request/response calls) of the network traffic and the area 1635-2 may show detailed information regarding a selected network traffic in area 1635-1. Each of the HTTP calls may be composed of one or more data packets. In various embodiments, HTTP call 1636-1 may correspond to updated data for area 1634-1, HTTP call 1636-2 may correspond to updated data for area 1636-2, and HTTP call 1636-3 may correspond to updated data for area 1636-3.

Figure 17:
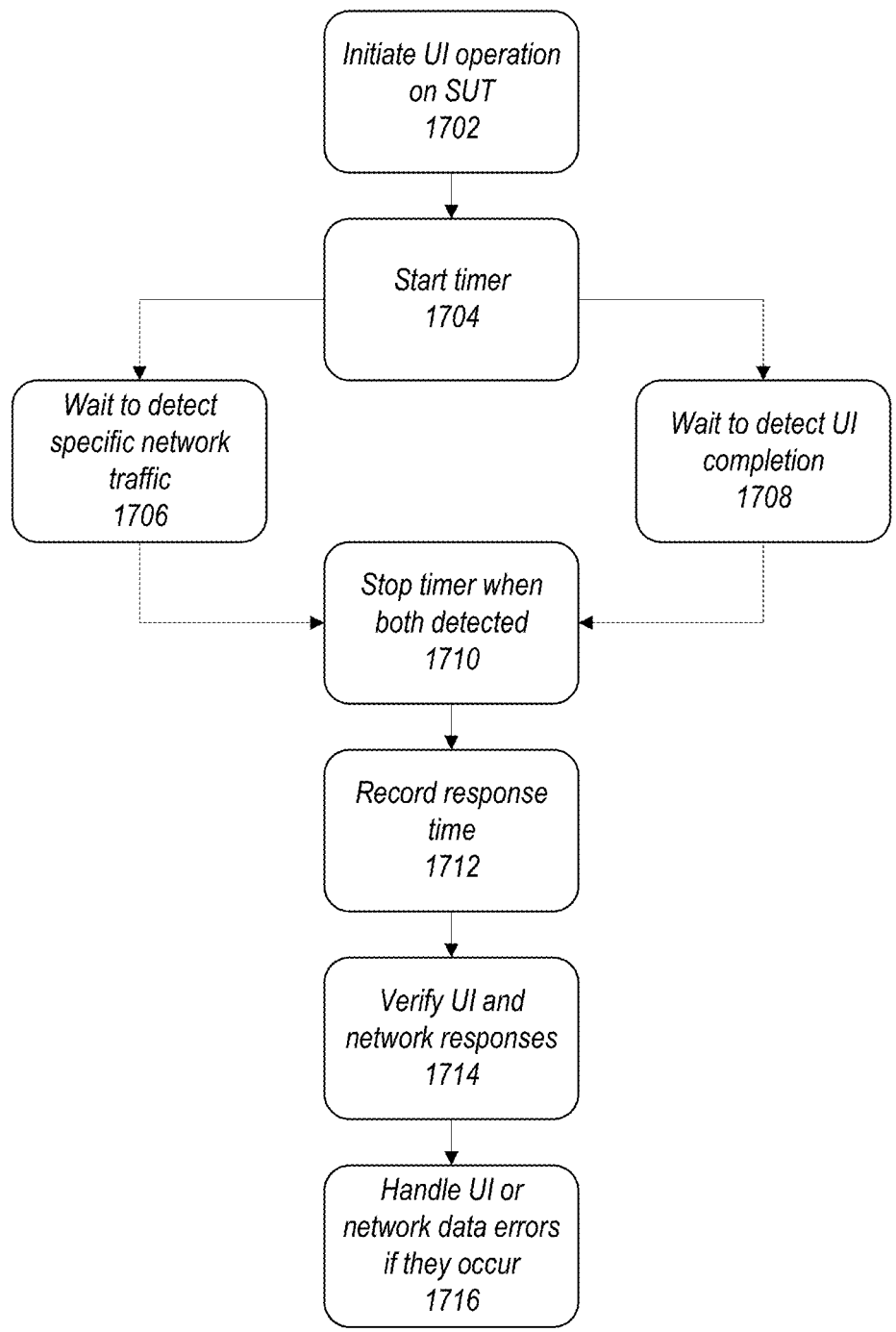
FIG. 17 illustrates a first exemplary logic flow for a software testing system, according to some embodiments of the present technology.

FIG. 17 illustrates an example embodiment of a logic flow 1700. FIGS. 18-21C illustrate codes snippets 1800, 1900, 2000, 2100 for exemplary implementations of various aspects of logic flow 1700. The logic flow 1700 may be representative of some or all of the operations executed by one or more embodiments described herein. More specifically, the logic flow 1700 may illustrate operations performed by one or more components a software testing system, such as a UIAT, a test manager, and/or a network sniffer. In one or more embodiments, these operations may be performed in conjunction with accurately and consistently determining when an operation is complete during implementation of a test workflow to evaluate software (e.g., an application). In many embodiments, the code snippets 1800, 1900, 2000, 2100 may form one or more portions of a test manager (e.g., test manager 1512) when executed by logic circuitry. It will be appreciated that various commented out portions of code (e.g., preceded by "//") may provide additional and/or alternative functionality. Additionally, commented out portions of text may explain one or more aspects of the code snippet. Further, code snippets may utilize one or more layers of function calls, one or more libraries, and other tools without departing from the scope of this disclosure. Embodiments are not limited in this context.

In the illustrated embodiment shown in FIG. 17, the logic flow 1700 may begin at block 1702. At block 1702, a UI operation may be initiated on a SUT. For example, UIAT 1510 may initiate a UI operation on SUT 1404 via user interface 1416. In many embodiments, the UI operation may be initiated during implementation of test workflow 1520. In the embodiment associated with code snippets 1800, 1900, 2000, 2100, one or more inputs may be provided to a function to initiate a UIT operation (e.g., SelectPopoutItem), in implementing block 1702. Continuing to block 1704, a timer may be started. For instance, test manager 1512 may initiate timer 1528 in response to initiation of the UI operation of the SUT. In various embodiments, one or more timers may be initiated at block 1704. For example, the UI operation may comprise the acquisition of three data sets and a timer may be started for each of the three data sets. In the embodiment associated with code snippets 1800, 1900, 2000, 2100, one or more inputs may be provided to a function, Stopwatch_Module ( ), in implementing block 1704. Proceeding to block 1706, the logic flow 1700 may wait to detect specific network traffic. For example, test manager 1412 may wait to detect specific network traffic associated with completion of the UI operation (i.e., network completion data) by polling network sniffer 1414. In the embodiment associated with code snippets 1800, 1900, 2000, 2100, one or more inputs may be provided to a function, WaitForJobsWithCSVs ( ), in implementing block 1706. One or more portions of WaitForJobsWithCSVs ( ) is illustrated in code snippet 1800 of FIG. 18. WaitForJobsWithCSVs ( ) waits for a job to complete. Further, WaitForJobsWithCSVs ( ) includes multiple layers of function calls. For example, code snippets 1900, 2000 correspond to function calls associated with WaitForJobsWithCSVs ( ). More specifically, code snippet 1900 in FIGS. 19A and 19B corresponds to a function, WaitForRequestsWithRelatedURLs ( ), that is called by WaitForJobsWithCSVs ( ) and code snippet 2000 in FIGS. 20A-20C corresponds to a function, internal_ConfirmRequestsCompletedWithContent ( ), that is called by WaitForRequestsWithRelatedURLs ( ). Lines 17-26 of code snippet 2000 in FIG. 20A provide a sample code used to count a number of requests, showing "For each Request (HttpWatch.Entry) in the list of Requests that were made (plugin.Log.Entries) . . . . If the URL of the Requests contains URLFilter, AND the Request is complete, AND the Text of the Response is not Null, and the Text of the Response contains FileContent . . . . Then tally this as a Completed request."

In parallel with block 1706, at block 1708, the logic flow 1700 may wait to detect UI completion. For instance, UIAT may wait to detect an indication via UI 1416 (i.e., UI completion data) that the operation has completed. In the embodiment associated with code snippets 1800, 1900, 2000, 2100, a function, NotExists, is called in implementing block 1708. Continuing to block 1710, the timer may be stopped when both the specific network traffic and the UI completion are detected. For example, test manager 1512 may stop timer 1528 when test manager 1512 detects specific network traffic associated with completion of the UI operation and UIAT 1510 detects UI completion. In the embodiment associated with code snippets 1800, 1900, 2000, 2100, one or more inputs may be provided to a function, Stopwatch_Module ( ), in implementing block 1710 and block 1712.

At block 1712, the response/completion time may be recorded. For example, test manager 1512 may record the response time in test digest 1530. Proceeding to block 1714, the UI and network responses may be verified. For instance, response validator 1528 may verify one or more of the UI and network responses (i.e., one or more of the UI and network completion data). In various embodiments, network and/or UI completion data may be verified by comparison to predetermined network and/or UI completion data. For example, predetermined network and/or UI completion data may be stored in test settings 1522. In many embodiments, the predetermined network and/or UI completion data may include a range (e.g., 1-10) or variety (e.g., A, B, C, E, or 7) of values. In some embodiments, network completion data may comprise "state: completed" as part of a network response. In some such embodiments, the predetermined network completion data for the operation may be three network responses (e.g., one for each of the areas 1634) that include "state: completed". Continuing to block 1716, UI and/or network data errors may be handled, if they occur. For example, test manager 1512 may redirect to an error path (e.g., by triggering an exception) in response to an error being detected in one or more of the UI and network responses by response validator 1528.

In the embodiment associated with code snippets 1800, 1900, 2000, 2100, one or more inputs may be provided to a function, CheckFileContents ( ), in implementing block 1714 and block 1716. Further, one or more portions of CheckFileContents ( ) is illustrated in code snippet 2100 of FIGS. 21A-21C. CheckFileContents ( ) checks for the string "Athlete" to be in one of the responses. Lines 26-34 of code snippet 2100 in FIG. 21A provide a sample code used to validate file contents, showing "For each Request (HttpWatch.Entry) in the list of Requests that were made (plugin.Log.Entries), If the URL contains ValidationText, then report Success."

In various embodiments, after block 1716, the logic flow 1700 may proceed to a next operation in the test workflow. If the next step of the test workflow involves initiation of another UI operation (i.e., operation initiated via a UI) that involves network traffic and recording the timing of the operation, the logic flow 1700 may return to block 1702. Similarly, if the next step of the test workflow involves initiation of an API operation (i.e., operation initiated via an API) that involves network traffic and recording the timing of the operation, the logic flow 1700 may proceed to block 1704 after initiation of the API operation. However, if the next step of the test workflow does not involve network traffic or is not timed, then logic flow 1700 may proceed to a different logic flow, and possibly return to logic flow 1700 later in the test workflow. In some embodiments, once the test workflow is complete, the network traffic may be analyzed. For example, network traffic captured by traffic recorder 1533 of network sniffer 1514 may be analyzed by test manager 1512.

In one or more embodiments, block 1706 and/or block 1708 may not be needed prior to block 1710 (see, e.g., FIG. 22). For instance, only one of those blocks may be necessary.

FIG. 22 illustrates an example embodiment of a logic flow 2200. The logic flow 2200 may be representative of some or all of the operations executed by one or more embodiments described herein. More specifically, the logic flow 2200 may illustrate operations performed by one or more components a software testing system, such as a UIAT, a test manager, and/or a network sniffer. In one or more embodiments, these operations may be performed in conjunction with accurately and consistently determining when an operation is complete during implementation of a test workflow to evaluate software (e.g., an application). Embodiments are not limited in this context.

In the illustrated embodiment shown in FIG. 22, the logic flow 2200 may start at block 2202. At block 2204, the next UI operation in the workflow may be initiated. For example, UIAT 1510 may initiate a UI operation on SUT 1404 via user interface 1416. In many embodiments, the UI operation may be initiated during implementation of test workflow 1520. In many embodiments, one or more timers may be started in conjunction, or in response, to initiation of the UI operation. Proceeding to block 2206, the logic flow 2200 may wait for one or more network requests and/or responses to complete. For example, test manager 1412 may wait to detect specific network traffic comprising a network request associated with the UI operation and/or specific network traffic comprising a network response associated with the UI operation. In one or more embodiments, the network request may comprise an HTTP request to get or post data and/or the network response may comprise an HTTP response with the data. In many embodiments, logic flow 2200 may wait for a predetermined amount of time before proceeding to block 2208 and polling the network sniffer. In many such embodiments, the predetermined amount of time may be different for the network request and the network response. Further, the predetermined amounts of time may be equal to or less than an optimal and/or minimum amount of time that it is possible to complete the network request/response. Still further, the predetermined amounts of time may decrease. For example, after the first predetermined amounts of time have elapsed, subsequent predetermined amounts of time may be reduced to one percent or less of the first predetermined amounts of time. In other words, the polling frequency may be dynamically adjusted.

At block 2208, after the logic flow 2200 has waited for the network request and/or response to complete, a network sniffer may be polled. For example, traffic monitor 1535 of network sniffer 1514 may be polled. Continuing to block 2210, it may be determined if the network request and/or response has completed based on polling of the network sniffer. If the network request and/or response has not completed, the logic flow 2200 may proceed to block 2212. At block 2212, it may be determined whether an error condition is satisfied. For example, test manager 1512 may determine whether an error condition has been satisfied based on test settings 1522. In another example, test manager 1512 may determine an error condition has been satisfied based on incorrect network completion data. If an error condition is not satisfied, the logic flow 2200 may return to block 2206. However, if an error condition is satisfied, the logic flow 2200 may proceed to block 2214. Referring back to block 2210, similarly, if the network request and/or response is determined to be completed at block 2210, the logic flow may proceed to block 2214. In many embodiments, error conditions may be checked, similar to block 2212, for when the network request and/or response is determined to be completed at block 2210 and prior to the logic flow may proceed to block 2214.

At block 2214 metrics regarding the initiated UI operation and/or implementation of the overall workflow may be verified/recorded/reported. For example, if the logic flow 2200 arrives at block 2214 from block 2210, metrics associated with completion of the network request and/or response may be recorded in a test digest. However, if the logic flow 2200 arrives at block 2214 from block 2212, metrics associated with the error condition and/or network request and/or response may be recorded in the test digest. Continuing to block 2216, it may be determined if the testing has completed and/or ended. For example, the testing may be ended after an error condition is satisfied or the testing may be completed after the test workflow has been performed. On the other hand, if no error condition has been satisfied (i.e., logic flow 2200 determines the network request and/or response has completed) and the test workflow has not been fully performed, the logic flow 2200 may return to block 2204 and the next UI operation in the workflow may be initiated. In other embodiments, the logic flow 2200 may proceed from block 2204 to block 2212, then to block 2214, block 2216, and return to block 2204 or end at block 2218. For example, operations that do not involve network communications may proceed in this alternate manner Additionally, or alternatively, logic flow 2200 may include one or more error paths that are followed/entered upon detection of an error.

FIGS. 23A and 23B illustrates an embodiment of a logic flow 2300. The logic flow 2300 may be representative of some or all of the operations executed by one or more embodiments described herein. More specifically, the logic flow 2300 may illustrate operations performed by one or more components of STS 1302, 1402, 1502. In one or more embodiments, these operations may be performed in conjunction with accurately and consistently determining when an operation is complete during implementation of a test workflow to evaluate software. Embodiments are not limited in this context.

In the illustrated embodiment shown in FIGS. 23A and 23B, the logic flow 2300 may begin at block 2302. At block 2302 a first operation in a software under test (SUT) may be initiated with a user interface automation tool (UIAT) during implementation of a workflow to evaluate the SUT, wherein the first operation comprises one of a plurality of operations in the workflow for performance by the SUT during evaluation of the SUT, and wherein the UIAT initiates the first operation via a user interface of the SUT. For example, UIAT 1410 may initiate a first operation on SUT 1404 via user interface 1416. Proceeding to block 2304, a timer may be started in response to initiation of the first operation in the SUT by the UIAT. For instance, timer 1528 may be started in response to initiation of the first operation.

Continuing to block 2306, operation of the user interface may be monitored to identify a response associated with performance of the first operation by the SUT. For example, operation of user interface 1416 may be monitored to identify a response associated with performance of the first operation by the SUT 1404. At block 2308 UI completion data may be determined based on the response identified from the user interface and associated with completion of the first operation by the SUT, wherein the UI completion data comprises an indication that the first operation has been performed by the SUT. For instance, removal of the loading bars from areas 1634 may be used to determine the UI completion data.

Proceeding to block 2310, network traffic associated with the first operation may be recorded in a test digest, wherein the test digest comprises one or more storage locations on one or more computer-readable media. For example, network traffic may be recorded in test digest 1530 by traffic recorder 1533. Continuing to block 2312, network traffic between the SUT and a test server may be monitored to detect specific network traffic associated with completion of the first operation by the SUT, wherein the specific network traffic associated with completion of the first operation by the SUT comprises one or more of a network request and a network response. For instance, network traffic between SUT 1404 and test server 1408 may be monitored by network sniffer 1414 to detect specific network traffic associated with completion of the first operation by the SUT.

At block 2314 network completion data may be determined based on detection of the specific network traffic associated with completion of the first operation by the SUT. For example, network complete data may be determined based on detection of HTTP call 1632-3. Proceeding to block 2316, the timer may be stopped in response to determination of the UI completion data and the network completion data. For instance, timer 1528 may be stopped in response to determination of the UI completion data and the network completion data. Continuing to block 2318, a response time may be recorded in the test digest for the first operation in the SUT based on an amount of time indicated by the timer. For example, a response time may be recorded in test digest 1530 based on an amount of time indicated by the timer 1528.

Proceeding to block 2320, the UI completion data may be verified based on comparison of the UI completion data to predetermined UI completion data. For instance, the UI completion data may be verified by response validator 1526 based on comparison of the UI completion data to predetermined UI completion data stored in test settings 1522. At block 2322 verification of the UI completion data may be recorded in the test digest. For example, verification of the UI completion data may be recorded in test digest 1530 by response validator 1526. Continuing to block 2324 the network completion data may be verified based on comparison of the network completion data to predetermined network completion data. For instance, the network completion data may be verified by response validator 1526 based on comparison of the network completion data to predetermined network completion data stored in test settings 1522.

At block 2326, verification of the network completion data may be recorded in the test digest. For example, verification of the network completion data may be recorded in test digest 1530 by response validator 1526. Proceeding to block 2328 a second operation may be initiated in the SUT with the UIAT based on verification of the UI completion data and the network completion data, wherein the second operation comprises one of the plurality of operations in the workflow for performance by the SUT during evaluation of the SUT, and wherein the UIAT initiates the second operation via the user interface of the SUT. For example, a second operation may be initiated in SUT 1404 with UIAT 1410 based on verification of the UI completion data and the network completion data.

In many embodiments, one or more portions of the processing or logic flows described herein, including the components of which each is composed, may be selected to be operative on whatever type of processor or processors that are selected to implement one or more components described herein. For instance, these may include any of a wide variety of commercially available processors. Further, one or more of these processors may include multiple processors, a multi-threaded processor, a multi-core processor (whether the multiple cores coexist on the same or separate dies), and/or a multiprocessor architecture of some other variety by which multiple physically separate processors are linked.

In various embodiments, one or more processors and/or devices used to implement portions of the processing or logic flows described herein may be selected to efficiently perform one or more operations described herein. In some embodiments, one or more operations described herein may be performed at least partially in parallel. By way of example, processors may incorporate a single-instruction multiple-data (SIMD) architecture, may incorporate multiple processing pipelines, and/or may incorporate the ability to support multiple simultaneous threads of execution per processing pipeline.

In some embodiments, each of these one or more portions of the processing or logic flows described herein may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for the processing or logic circuitry. Where one or more device drivers are included, those device drivers may provide support for any of a variety of other components, whether hardware or software components, described herein.

In various embodiments, one or more components of STS 1302, 1402, 1502 may utilize or include storage and/or memory (e.g., test digest 1530). In various such embodiments, the storage and/or memory may be based on any of a wide variety of information storage technologies, including volatile technologies requiring the uninterrupted provision of electric power, and/or including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, non-volatile storage class memory, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid-state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller). However, in one or more embodiments, storage and/or memory of one or more of the node may be implemented with a redundant array of independent discs (RAID) of a RAID level selected to provide fault tolerance to prevent loss of one or more of these datasets and/or to provide increased speed in accessing one or more of these datasets.

In various embodiments, one or more of the interfaces described herein may each utilize or include any of a variety of types of input device that may each employ any of a wide variety of input detection and/or reception technologies. Examples of such input devices include, and are not limited to, microphones, remote controls, stylus pens, card readers, finger print readers, virtual reality interaction gloves, graphical input tablets, joysticks, keyboards, retina scanners, the touch input components of touch screens, trackballs, environmental sensors, and/or either cameras or camera arrays to monitor movement of persons to accept commands and/or data provided by those persons via gestures and/or facial expressions. Various embodiments may include or utilize one or more displays to present information. In various such embodiments, each of the displays may each be any of a variety of types of display device that may each employ any of a wide variety of visual presentation technologies. Examples of such a display device includes, and is not limited to, a cathode-ray tube (CRT), an electroluminescent (EL) panel, a liquid crystal display (LCD), a gas plasma display, etc. In some embodiments, one or more of the interfaces may be a touchscreen display.

Some embodiments may include one or more network interfaces that employ any of a wide variety of communications technologies enabling these devices to be coupled to one or more other devices. Each of these interfaces includes circuitry providing at least some of the requisite functionality to enable such coupling. However, each of these interfaces may also be at least partially implemented with sequences of instructions executed by corresponding ones of the processors (e.g., to implement a protocol stack or other features). Where electrically and/or optically conductive cabling is employed, these interfaces may employ timings and/or protocols conforming to any of a variety of industry standards, including without limitation, RS-232C, RS-422, Universal Serial Bus (USB), Ethernet (IEEE-802.3) or IEEE-1394. Where the use of wireless transmissions is entailed, these interfaces may employ timings and/or protocols conforming to any of a variety of industry standards, including without limitation, IEEE 802.11a, 802.11ad, 802.11ah, 802.11ax, 802.11b, 802.11g, 802.15, 802.16, 802.20 (commonly referred to as "Mobile Broadband Wireless Access"); Near-Field-Communication (NFC); Bluetooth®; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, 5G, etc. However, in a specific embodiment, a network interface may be implemented with multiple copper-based or fiber-optic based network interface ports to provide redundant and/or parallel pathways in exchanging data.

In various embodiments, the processing, memory, and/or storage resources of one or more components described herein may be divided among the multiple systems. In various such embodiments, one or more API architectures may support communications among the multiple systems. The one or more API architectures may be configured to and/or selected to conform to any of a variety of standards for distributed processing, including without limitation, IEEE P2413, AllJoyn, IoTivity, etc. By way of example, a subset of API and/or other architectural features of one or more of such standards may be employed to implement the relatively minimal degree of coordination described herein to provide greater efficiency in parallelizing processing of data, while minimizing exchanges of coordinating information that may lead to undesired instances of serialization among processes. However, it should be noted that the parallelization of storage, retrieval and/or processing of data among multiple systems is not dependent on, nor constrained by, existing API architectures and/or supporting communications protocols. More broadly, there is nothing in the manner in which the data may be organized in storage, transmission, and/or distribution via network interface that is bound to existing API architectures or protocols.

Some systems may use an open-source framework for storing and analyzing data in a distributed computing environment, such as Hadoop®. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing.

The invention claimed is:

1. An apparatus comprising a processor and a storage to store instructions that, when executed by the processor, cause the processor to perform operations comprising:
   initiate a first operation in a software under test (SUT) with a user interface automation tool (UIAT) during implementation of a workflow to evaluate the SUT, wherein the first operation comprises one of a plurality of operations in the workflow for performance by the SUT during evaluation of the SUT, and wherein the UIAT initiates the first operation via a user interface of the SUT;
   start a timer in response to initiation of the first operation in the SUT by the UIAT;
   monitor operation of the user interface to identify a response associated with performance of the first operation by the SUT;
   determine UI completion data based on the response identified from the user interface and associated with completion of the first operation by the SUT, wherein the UI completion data comprises an indication that the first operation has been performed by the SUT;
   record network traffic associated with the first operation in a test digest, wherein the test digest comprises one or more storage locations on one or more computer-readable media;
   monitor network traffic between the SUT and a test server to detect specific network traffic associated with completion of the first operation by the SUT, wherein the specific network traffic associated with completion of the first operation by the SUT comprises one or more of a network request and a network response;
   determine network completion data based on detection of the specific network traffic associated with completion of the first operation by the SUT;
   stop the timer in response to determination of the UI completion data and the network completion data;
   record, in the test digest, a response time for the first operation in the SUT based on an amount of time indicated by the timer;
   verify the UI completion data based on comparison of the UI completion data to predetermined UI completion data;
   record verification of the UI completion data in the test digest;
   verify the network completion data based on comparison of the network completion data to predetermined network completion data;
   record verification of the network completion data in the test digest; and
   initiate a second operation in the SUT with the UIAT based on verification of the UI completion data and the network completion data, wherein the second operation comprises one of the plurality of operations in the workflow for performance by the SUT during evaluation of the SUT, and wherein the UIAT initiates the second operation via the user interface of the SUT.

2. The apparatus of claim 1, wherein the processor is caused to perform operations comprising:
   start a second timer in response to initiation of the second operation in the SUT with the UIAT;
   record network traffic associated with the second operation in the test digest;
   monitor network traffic between the SUT and a test server to detect specific network traffic associated with performance of the second operation by the SUT;
   determine second network completion data based on detection of the specific network traffic associated with performance of the second operation by the SUT;
   stop the second timer in response to determination of the second network completion data; and
   record, in the test digest, a response time for the second operation in the SUT based on an amount of time indicated by the second timer.

3. The apparatus of claim 2, wherein the processor is caused to perform operations comprising:
   analyze the network traffic associated with the second operation to determine an error associated with performance of the second operation by the SUT;
   determine the error associated with performance of the second operation by the SUT is not detrimental to evaluation of the SUT via the workflow; and
   initiate a third operation in the SUT with the UIAT based on determination the error is not detrimental to evaluation of the SUT via the workflow, wherein the third operation comprises one of the plurality of operations in the workflow for performance by the SUT during evaluation of the SUT.

4. The apparatus of claim 3, wherein the processor is caused to perform operations comprising record an indication of the error and data associated with the error in the test digest based on determination the error associated with performance of the second operation by the SUT is not detrimental to evaluation of the SUT via the workflow.

5. The apparatus of claim 2, wherein the processor is caused to perform operations comprising:
analyze the network traffic associated with the second operation to determine an error associated with performance of the second operation by the SUT;
determine the error associated with performance of the second operation by the SUT is detrimental to evaluation of the SUT via the workflow; and
end implementation of the workflow based on determination the error associated with performance of the second operation by the SUT is detrimental to evaluation of the SUT via the workflow.

6. The apparatus of claim 5, wherein the processor is caused to perform operations comprising present an indication of the error and data associated with the error via a user interface based on determination the error associated with performance of the second operation by the SUT is detrimental to evaluation of the SUT via the workflow.

7. The apparatus of claim 1, wherein the processor is caused to perform operations comprising:
analyze the network traffic associated with the first operation to determine an error associated with performance of the first operation by the SUT;
record the error associated with performance of the first operation by the SUT in the test digest;
determine the error associated with performance of the first operation by the SUT is not detrimental to the evaluation of the SUT via the workflow; and
initiate the second operation in the SUT with the UIAT based on determination the error is not detrimental to evaluation of the SUT via the workflow.

8. The apparatus of claim 1, wherein the user interface of the SUT comprises a graphical user interface (GUI) and the response identified from the user interface, associated with completion of the first operation by the SUT, and used to determine the network completion data comprising removal, from the user interface, of a progress indicator that corresponds to loading data associated with execution of the first operation by the SUT.

9. The apparatus of claim 1, wherein the user interface of the SUT comprises a graphical user interface (GUI), the UI completion data comprises an image of a current configuration of the GUI, the predetermined UI completion data comprising an image of a target configuration of the GUI, and the processor is caused to perform operations comprising verify the UI completion data based on comparison of the UI completion data to predetermined UI completion data that indicates the image of the current configuration of the GUI matches the image of the target configuration of the GUI.

10. The apparatus of claim 1, wherein the specific network traffic associated with completion of the first operation by the SUT comprises one or more of a first HTTP message sent from the SUT to the test server and a second HTTP message sent from the test server to the SUT.

11. A computer-implemented method, comprising: initiating a first operation in a software under test (SUT) with a user interface automation tool (UIAT) during implementation of a workflow to evaluate the SUT, wherein the first operation comprises one of a plurality of operations in the workflow for performance by the SUT during evaluation of the SUT, and wherein the UIAT initiates the first operation via a user interface of the SUT;
starting a timer in response to initiation of the first operation in the SUT by the UIAT;
monitoring operation of the user interface to identify a response associated with performance of the first operation by the SUT;
determining UI completion data based on the response identified from the user interface and associated with completion of the first operation by the SUT, wherein the UI completion data comprises an indication that the first operation has been performed by the SUT;
recording network traffic associated with the first operation in a test digest, wherein the test digest comprises one or more storage locations on one or more computer-readable media;
monitoring network traffic between the SUT and a test server to detect specific network traffic associated with completion of the first operation by the SUT, wherein the specific network traffic associated with completion of the first operation by the SUT comprises one or more of a network request and a network response;
determining network completion data based on detection of the specific network traffic associated with completion of the first operation by the SUT;
stopping the timer in response to determination of the UI completion data and the network completion data;
recording, in the test digest, a response time for the first operation in the SUT based on an amount of time indicated by the timer;
verifying the UI completion data based on comparison of the UI completion data to predetermined UI completion data;
recording verification of the UI completion data in the test digest;
verifying the network completion data based on comparison of the network completion data to predetermined network completion data;
recording verification of the network completion data in the test digest; and
initiating a second operation in the SUT with the UIAT based on verification of the UI completion data and the network completion data, wherein the second operation comprises one of the plurality of operations in the workflow for performance by the SUT during evaluation of the SUT, and wherein the UIAT initiates the second operation via the user interface of the SUT.

12. The computer-implemented method of claim 11, comprising:
starting a second timer in response to initiation of the second operation in the SUT with the UIAT;
recording network traffic associated with the second operation in the test digest;
monitoring network traffic between the SUT and a test server to detect specific network traffic associated with performance of the second operation by the SUT;
determining second network completion data based on detection of the specific network traffic associated with performance of the second operation by the SUT;
stopping the second timer in response to determination of the second network completion data; and
recording, in the test digest, a response time for the second operation in the SUT based on an amount of time indicated by the second timer.

13. The computer-implemented method of claim 12, comprising:
- analyzing the network traffic associated with the second operation to determine an error associated with performance of the second operation by the SUT;
- determining the error associated with performance of the second operation by the SUT is not detrimental to evaluation of the SUT via the workflow; and
- initiating a third operation in the SUT with the UIAT based on determination the error is not detrimental to evaluation of the SUT via the workflow, wherein the third operation comprises one of the plurality of operations in the workflow for performance by the SUT during evaluation of the SUT.

14. The computer-implemented method of claim 13, comprising recording an indication of the error and data associated with the error in the test digest based on determination the error associated with performance of the second operation by the SUT is not detrimental to evaluation of the SUT via the workflow.

15. The computer-implemented method of claim 12, comprising:
- analyzing the network traffic associated with the second operation to determine an error associated with performance of the second operation by the SUT;
- determining the error associated with performance of the second operation by the SUT is detrimental to evaluation of the SUT via the workflow; and
- ending implementation of the workflow based on determination the error associated with performance of the second operation by the SUT is detrimental to evaluation of the SUT via the workflow.

16. The computer-implemented method of claim 15, comprising presenting an indication of the error and data associated with the error via a user interface based on determination the error associated with performance of the second operation by the SUT is detrimental to evaluation of the SUT via the workflow.

17. The computer-implemented method of claim 11, comprising:
- analyzing the network traffic associated with the first operation to determine an error associated with performance of the first operation by the SUT;
- recording the error associated with performance of the first operation by the SUT in the test digest;
- determining the error associated with performance of the first operation by the SUT is not detrimental to the evaluation of the SUT via the workflow; and
- initiating the second operation in the SUT with the UIAT based on determination the error is not detrimental to evaluation of the SUT via the workflow.

18. The computer-implemented method of claim 11, wherein the user interface of the SUT comprises a graphical user interface (GUI) and the response identified from the user interface, associated with completion of the first operation by the SUT, and used to determine the network completion data comprises removal, from the user interface, of a progress indicator that corresponds to loading data associated with execution of the first operation by the SUT.

19. The computer-implemented method of claim 11, wherein the user interface of the SUT comprises a graphical user interface (GUI), the UI completion data comprises an image of a current configuration of the GUI, the predetermined UI completion data comprising an image of a target configuration of the GUI, and comprising verifying the UI completion data based on comparison of the UI completion data to predetermined UI completion data that indicates the image of the current configuration of the GUI matches the image of the target configuration of the GUI.

20. The computer-implemented method of claim 11, wherein the specific network traffic associated with completion of the first operation by the SUT comprises one or more of a first HTTP message sent from the SUT to the test server and a second HTTP message sent from the test server to the SUT.

21. A computer-program product tangibly embodied in a non-transitory machine-readable storage medium, the computer-program product including instructions operable to cause a processor to perform operations comprising:
- initiate a first operation in a software under test (SUT) with a user interface automation tool (UIAT) during implementation of a workflow to evaluate the SUT, wherein the first operation comprises one of a plurality of operations in the workflow for performance by the SUT during evaluation of the SUT, and wherein the UIAT initiates the first operation via a user interface of the SUT;
- start a timer in response to initiation of the first operation in the SUT by the UIAT;
- monitor operation of the user interface to identify a response associated with performance of the first operation by the SUT;
- determine UI completion data based on the response identified from the user interface and associated with completion of the first operation by the SUT, wherein the UI completion data comprises an indication that the first operation has been performed by the SUT;
- record network traffic associated with the first operation in a test digest, wherein the test digest comprises one or more storage locations on one or more computer-readable media;
- monitor network traffic between the SUT and a test server to detect specific network traffic associated with completion of the first operation by the SUT, wherein the specific network traffic associated with completion of the first operation by the SUT comprises one or more of a network request and a network response;
- determine network completion data based on detection of the specific network traffic associated with completion of the first operation by the SUT;
- stop the timer in response to determination of the UI completion data and the network completion data;
- record, in the test digest, a response time for the first operation in the SUT based on an amount of time indicated by the timer;
- verify the UI completion data based on comparison of the UI completion data to predetermined UI completion data;
- record verification of the UI completion data in the test digest;
- verify the network completion data based on comparison of the network completion data to predetermined network completion data;
- record verification of the network completion data in the test digest; and
- initiate a second operation in the SUT with the UIAT based on verification of the UI completion data and the network completion data, wherein the second operation comprises one of the plurality of operations in the workflow for performance by the SUT during evaluation of the SUT, and wherein the UIAT initiates the second operation via the user interface of the SUT.

22. The computer-program product of claim 21, including instructions operable to cause a processor to perform operations comprising:
   start a second timer in response to initiation of the second operation in the SUT with the UIAT;
   record network traffic associated with the second operation in the test digest;
   monitor network traffic between the SUT and a test server to detect specific network traffic associated with performance of the second operation by the SUT;
   determine second network completion data based on detection of the specific network traffic associated with performance of the second operation by the SUT;
   stop the second timer in response to determination of the second network completion data; and
   record, in the test digest, a response time for the second operation in the SUT based on an amount of time indicated by the second timer.

23. The computer-program product of claim 22, including instructions operable to cause a processor to perform operations comprising:
   analyze the network traffic associated with the second operation to determine an error associated with performance of the second operation by the SUT;
   determine the error associated with performance of the second operation by the SUT is not detrimental to evaluation of the SUT via the workflow; and
   initiate a third operation in the SUT with the UIAT based on determination the error is not detrimental to evaluation of the SUT via the workflow, wherein the third operation comprises one of the plurality of operations in the workflow for performance by the SUT during evaluation of the SUT.

24. The computer-program product of claim 23, including instructions operable to cause a processor to perform operations comprising record an indication of the error and data associated with the error in the test digest based on determination the error associated with performance of the second operation by the SUT is not detrimental to evaluation of the SUT via the workflow.

25. The computer-program product of claim 22, including instructions operable to cause a processor to perform operations comprising:
   analyze the network traffic associated with the second operation to determine an error associated with performance of the second operation by the SUT;
   determine the error associated with performance of the second operation by the SUT is detrimental to evaluation of the SUT via the workflow; and
   end implementation of the workflow based on determination the error associated with performance of the second operation by the SUT is detrimental to evaluation of the SUT via the workflow.

26. The computer-program product of claim 25, including instructions operable to cause a processor to perform operations comprising present an indication of the error and data associated with the error via a user interface based on determination the error associated with performance of the second operation by the SUT is detrimental to evaluation of the SUT via the workflow.

27. The computer-program product of claim 21, including instructions operable to cause a processor to perform operations comprising:
   analyze the network traffic associated with the first operation to determine an error associated with performance of the first operation by the SUT;
   record the error associated with performance of the first operation by the SUT in the test digest;
   determine the error associated with performance of the first operation by the SUT is not detrimental to the evaluation of the SUT via the workflow; and
   initiate the second operation in the SUT with the UIAT based on determination the error is not detrimental to evaluation of the SUT via the workflow.

28. The computer-program product of claim 21, wherein the user interface of the SUT comprises a graphical user interface (GUI) and the response identified from the user interface, associated with completion of the first operation by the SUT, and used to determine the network completion data comprising removal, from the user interface, of a progress indicator that corresponds to loading data associated with execution of the first operation by the SUT.

29. The computer-program product of claim 21, wherein the user interface of the SUT comprises a graphical user interface (GUI), the UI completion data comprises an image of a current configuration of the GUI, the predetermined UI completion data comprising an image of a target configuration of the GUI, and the computer-program product including instructions operable to cause a processor to perform operations comprising verify the UI completion data based on comparison of the UI completion data to predetermined UI completion data that indicates the image of the current configuration of the GUI matches the image of the target configuration of the GUI.

30. The computer-program product of claim 21, wherein the specific network traffic associated with completion of the first operation by the SUT comprises one or more of a first HTTP message sent from the SUT to the test server and a second HTTP message sent from the test server to the SUT.

\* \* \* \* \*